US006704042B2

(12) United States Patent
Matsui et al.

(10) Patent No.: US 6,704,042 B2
(45) Date of Patent: *Mar. 9, 2004

(54) VIDEO PROCESSING APPARATUS, CONTROL METHOD THEREFOR, AND STORAGE MEDIUM

(75) Inventors: Taichi Matsui, Sagamihara (JP); Hiroaki Sato, Tokyo (JP); Hideo Noro, Tokyo (JP); Tomohiko Matsuura, Utsunomiya (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,293

(22) Filed: Dec. 8, 1999

(65) Prior Publication Data
US 2003/0128273 A1 Jul. 10, 2003

(30) Foreign Application Priority Data

Dec. 10, 1998 (JP) ............................. 10-351892
Dec. 25, 1998 (JP) ............................. 10-371689
Oct. 22, 1999 (JP) ............................. 11-301139

(51) Int. Cl.[7] ............................................... H04N 15/00
(52) U.S. Cl. ............................................ 348/43; 348/47
(58) Field of Search ................................. 348/47, 48, 15, 348/14, 43, 46, 42; 382/154, 106, 239, 284; 352/57; 345/419

(56) References Cited

U.S. PATENT DOCUMENTS

| | | | | |
|---|---|---|---|---|
| 5,134,510 A | * | 7/1992 | Lee | 358/142 |
| 5,495,576 A | * | 2/1996 | Ritchey | 345/420 |
| 5,606,348 A | * | 2/1997 | Chiu | 345/213 |
| 5,677,728 A | * | 10/1997 | Schoolman | 348/19 |
| 5,909,543 A |   | 6/1999 | Tanaka et al. | 395/200.34 |
| 5,982,951 A | * | 11/1999 | Katayama et al. | 382/284 |
| 6,104,858 A | * | 8/2000 | Suzuki | 386/65 |
| 6,205,241 B1 | * | 3/2001 | Melen | 382/154 |
| 6,236,428 B1 | * | 5/2001 | Fukushima | 348/42 |
| 6,285,368 B1 | * | 9/2001 | Sudo | 345/419 |
| 6,445,807 B1 | * | 9/2002 | Katayama et al. | 382/100 |
| 6,445,814 B2 | * | 9/2002 | Iijima et al. | 382/154 |
| 2001/0014171 A1 | * | 8/2001 | Iijima et al. | 382/154 |

FOREIGN PATENT DOCUMENTS

| | | |
|---|---|---|
| JP | 10-21401 | 1/1998 |
| JP | 10-23465 | 1/1998 |
| JP | 10-23469 | 1/1998 |

OTHER PUBLICATIONS

Item (1) Statement of Delivery of Goods; Item (2)Invoice; Item (3)Description of Goods Delivered and Invoiced, titled "Vertically Split Combination Device" Model FMX–300. Item (4) Translation of first page of item (3); and Item (5) Presentation of Information, dated Oct. 15, 2001.

* cited by examiner

Primary Examiner—Vu Le
Assistant Examiner—Behrooz Senfi
(74) Attorney, Agent, or Firm—Fitzpatrick, Cella, Harper & Scinto

(57) ABSTRACT

When stereoscopic video data is distributed through a network, some terminal cannot process the distributed stereoscopic video data because the format of the data does not correspond to the terminal. Likewise, when video data are input from a plurality of types of cameras with different stereoscopic video data formats, data of an incompatible format cannot be processed. In order to prevent this problem, there is provided a stereoscopic video apparatus which inputs stereoscopic video data, converts the format of the input stereoscopic video data into a format suitable to output operation, and outputs the converted stereoscopic video data to a network.

5 Claims, 20 Drawing Sheets

LEFT EYE

RIGHT EYE

BEFORE LIGHTNESS CORRECTION

AFTER LIGHTNESS CORRECTION

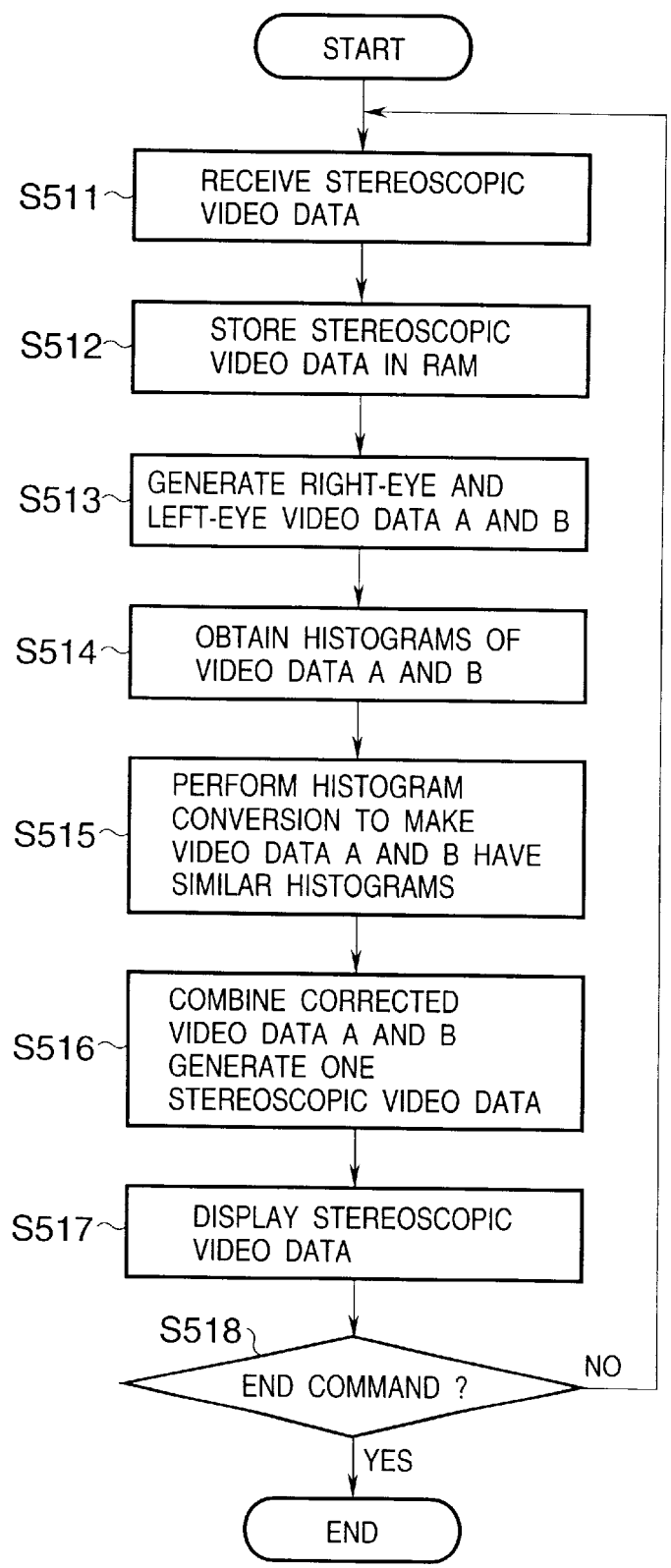

VIDEO PROCESSING APPARATUS, CONTROL METHOD THEREFOR, AND STORAGE MEDIUM

BACKGROUND OF THE INVENTION

1. Field of the Invention

The present invention relates to a stereoscopic video processing apparatus for processing stereoscopic video data for playback, transmission, and the like, a stereoscopic video processing method, and a storage medium.

2. Description of the Related Art

In an image sensing system capable of capturing the video signal obtained by a video camera in real time, the captured video data is transmitted to a remote place through a network. As systems for controlling the transmission rate of video signal data on the transmitting end, for example, WebView (Canon), RealVideo (RealNetworks), and VDO-Live (VDOnetwork) are known.

In this conventional video transmission display system, however, two-dimensional video data is transmitted, and a sense of depth cannot be expressed by this data. This poses a problem in terms of dynamism and realism. Demands have therefore arisen for video transmission systems capable of stereoscopic display.

Several mere stereoscopic video cameras and stereoscopic video display apparatuses have already been put into practice. It is theoretically conceivable that a stereoscopic video transmission display system can be constructed by incorporating such an apparatus into the above video transmission display system.

Many of the stereoscopic video cameras on the market are designed to output the stereoscopic image synthesized by combining video data from the cameras of two systems vertically or horizontally (the scheme of splitting a 1-frame data recording area into two consecutive areas and assigning the left-eye image to one area and the right-eye image to the other area) or to output line sequential video data by switching left-eye and right-eye images in units of lines of the video data.

Since conventional stereoscopic video display apparatuses are designed to be connected to compatible stereoscopic video cameras without the mediacy of networks, it suffices if stereoscopic video cameras compatible with the display apparatuses are prepared.

If, however, line sequential stereoscopic video data is distributed in the presence of a plurality of stereoscopic image formats through a network, the distributed stereoscopic video data may not be processed depending on a reception terminal because of an incompatible format.

In addition, when a plurality of types of stereoscopic video display devices are connected to one server, there is a possibility that some devices can play back video data but other devices cannot play back it depending on the format of the received stereoscopic video data.

SUMMARY OF THE INVENTION

It is an object of the present invention to solve all the problems described above or at least one of them.

It is another object of the present invention to provide a stereoscopic video processing apparatus corresponding to a plurality of types of stereoscopic video formats.

It is still another object of the present invention to provide a stereoscopic video processing apparatus capable of converting the format of input stereoscopic video data into an arbitrary format.

It is still another object of the present invention to provide a stereoscopic video apparatus capable of inputting a plurality of types of stereoscopic video formats.

It is still another object of the present invention to provide a stereoscopic video apparatus capable of outputting a plurality of types of stereoscopic video formats.

It is still another object of the present invention to provide a stereoscopic video apparatus capable of outputting stereoscopic video data in accordance with a stereoscopic video format in which data can be displayed on a display apparatus.

In order to achieve the above objects, according to a preferred embodiment of the present invention, there is provided a stereoscopic video processing apparatus comprising:

input means for inputting stereoscopic video data;

conversion means for converting a format of the stereoscopic video data input to the input means into a format suited to output operation; and output means for outputting the stereoscopic video data converted by the conversion means.

More preferably, the stereoscopic video processing apparatus outputs stereoscopic video data to the network.

It is still another object of the present invention to provide a stereoscopic video apparatus suited to distributing stereoscopic video data to a network.

In order to achieve the above object, according to a preferred embodiment of the present invention, there is provided a stereoscopic video processing apparatus comprising:

input means for inputting stereoscopic video data;

conversion means for converting a format of the stereoscopic video data input to the input means into a format suited to outputting the data to a network; and output means for outputting the stereoscopic video data converted by the conversion means.

More preferably, the stereoscopic video processing apparatus is characterized in that line sequential format data is input to the input means.

More preferably, the stereoscopic video processing apparatus further comprises compression means for compressing the stereoscopic video data converted by the conversion means.

It is still another object of the present invention to provide a stereoscopic video processing apparatus which can prevent a user from having a sense of incongruity due to a mismatch between the color appearance of a right-eye image and that of a left-eye image when input stereoscopic video data is to be displayed.

In order to achieve the above object, according to a preferred embodiment of the present invention, there is provided a stereoscopic video processing apparatus comprising:

input means for inputting stereoscopic video data;

detection means for detecting lightness information of each of video data obtained from the input means;

correction means for correcting right-eye and left-eye video data on the basis of the lightness information detected by the detection means;

generation means for generating stereoscopic video data by combining the video data corrected by the correction means; and output means for outputting the stereoscopic video data generated by the generation means.

Other features and advantages of the present invention will be apparent from the following description taken in conjunction with the accompanying renderings, in which like reference characters designate the same or similar parts throughout the figures thereof.

BRIEF DESCRIPTION OF THE DRAWINGS

FIG. 22 is a flow chart showing a procedure in the fifth embodiment.

DETAILED DESCRIPTION OF THE PREFERRED EMBODIMENTS

First Embodiment

An embodiment of the present invention will be described in detail below with reference to the accompanying drawings.

In this embodiment, the format of input stereoscopic video data is converted in accordance with the format, and the converted data is distributed to a network.

Figure 1:
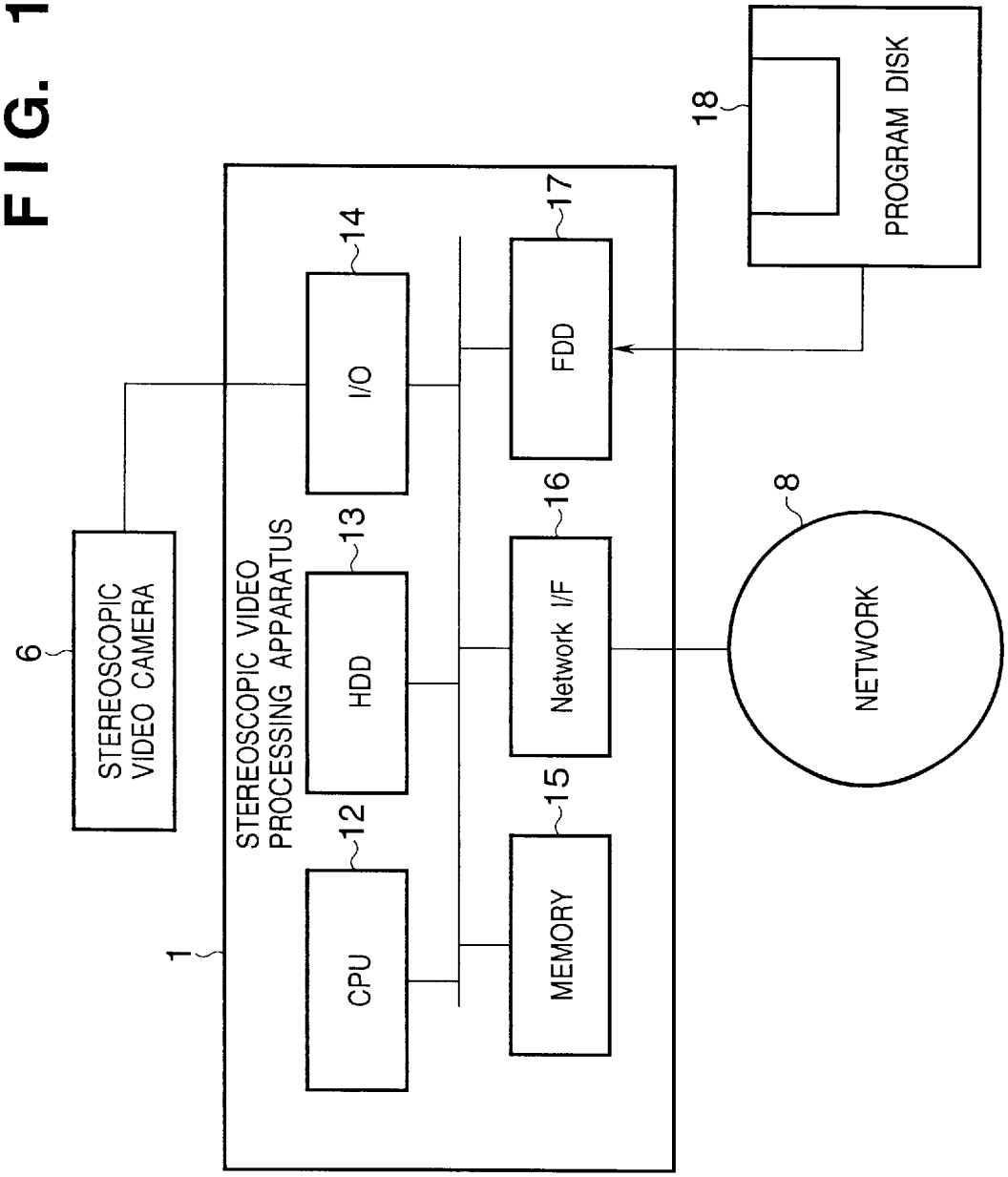
FIG. 1 is a block diagram showing the basic arrangement of a stereoscopic video processing apparatus.

FIG. 1 shows the basic arrangement of a stereoscopic video processing apparatus 1. The stereoscopic video processing apparatus 1 is comprised of a CPU 12 for controlling the overall apparatus, a HDD (Hard Disk Drive) 13 for storing various programs and data, a memory 15 for temporarily storing image data from a stereoscopic video camera 6, the program loaded from the HDD 13, and the like, a network I/F 16, an FDD (Floppy Disk Drive) 17 for exchanging data with a floppy disk, and the like. Note that the stereoscopic video camera 6 in this embodiment is obtained by integrating a plurality of cameras to simultaneously capture images of two systems.

In this embodiment, a program for making this stereoscopic video processing apparatus perform stereoscopic video processing is supplied through a medium such as a floppy disk.

More specifically, a floppy disk in which a program is stored is inserted into the FDD 17, and this program is loaded under the control of the CPU 12 to be supplied to the HDD 13 or memory 15.

The stereoscopic video data input from the stereoscopic video camera 6 is stored in the memory 15 and subjected to the following format conversion and the like under the control of the CPU 12 in accordance with the program stored in the memory 15 and loaded from the floppy disk 18 or HDD 13.

Figure 2:
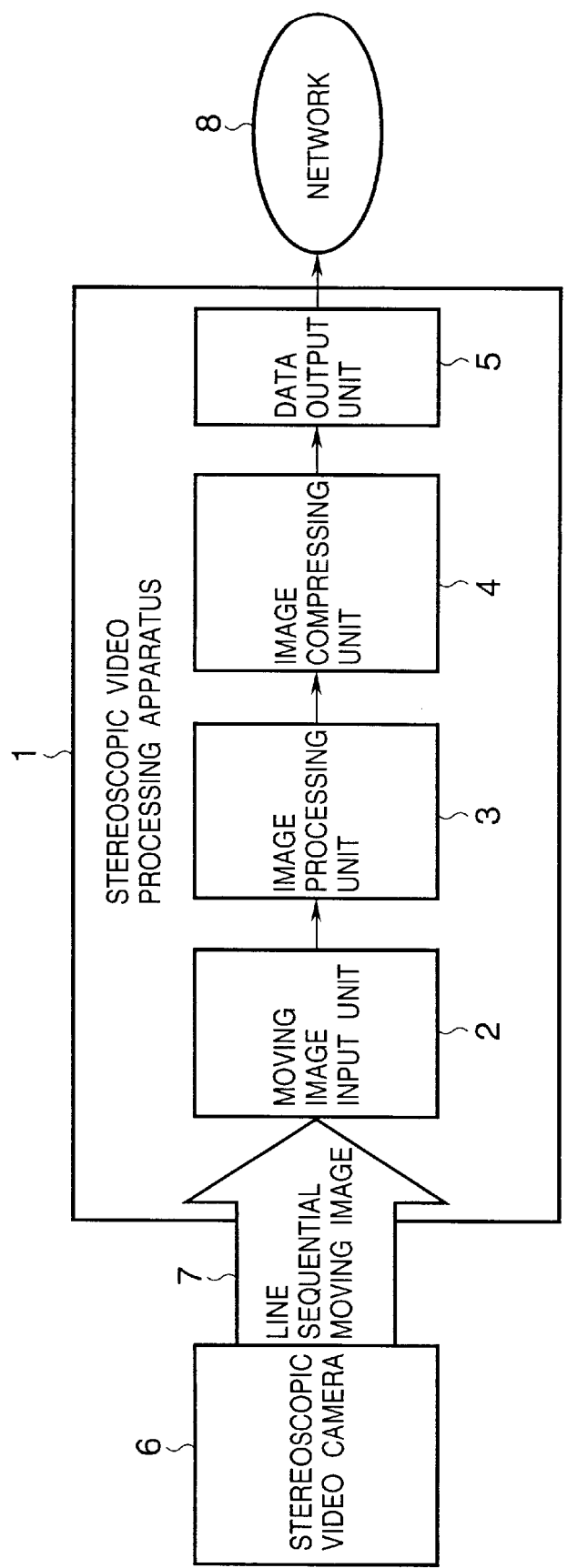
FIG. 2 is a block diagram showing an overview of the flow of stereoscopic video processing to be performed when line sequential moving image data is input.

FIG. 2 schematically shows the flow of stereoscopic video processing in the stereoscopic video processing apparatus, and more specifically, a case wherein a line sequential moving image is input from a stereoscopic video camera, and the format of the image data is converted into the format of stereoscopic image data to be distributed to the network such that a 1-frame data recording area is segmented into two consecutive areas, and the left-eye image is assigned to one area and the right-eye image to the other area.

This stereoscopic video processing is implemented by the arrangement constituted by a moving image input unit 2, image processing unit 3, image compressing unit 4, and data output unit 5.

Note that right-eye and left-eye image are synthesized into one frame to be transmitted for the following reason. The video data from the stereoscopic video camera are two video data transmitted from different cameras. If, therefore, these data are separately transmitted, the data must be synchronized on the receiving end. In addition, if one of the video data cannot be received from the network through which the data are transmitted, stereoscopic video data is difficult to play back.

When, therefore, stereoscopic video data are to be transmitted to a network, the right-eye and left-eye images are preferably synthesized into one frame and transmitted.

A line sequential moving image 7 is input as stereoscopic video data from the stereoscopic video camera 6 to the moving image input unit 2. The image processing unit 3 processes the input line sequential moving image 7 to convert the format of the data into the format in which a 1-frame data recording area is segmented into two consecutive areas and the left-eye image is assigned to one area and the right-eye image to the right-eye.

Figure 3:
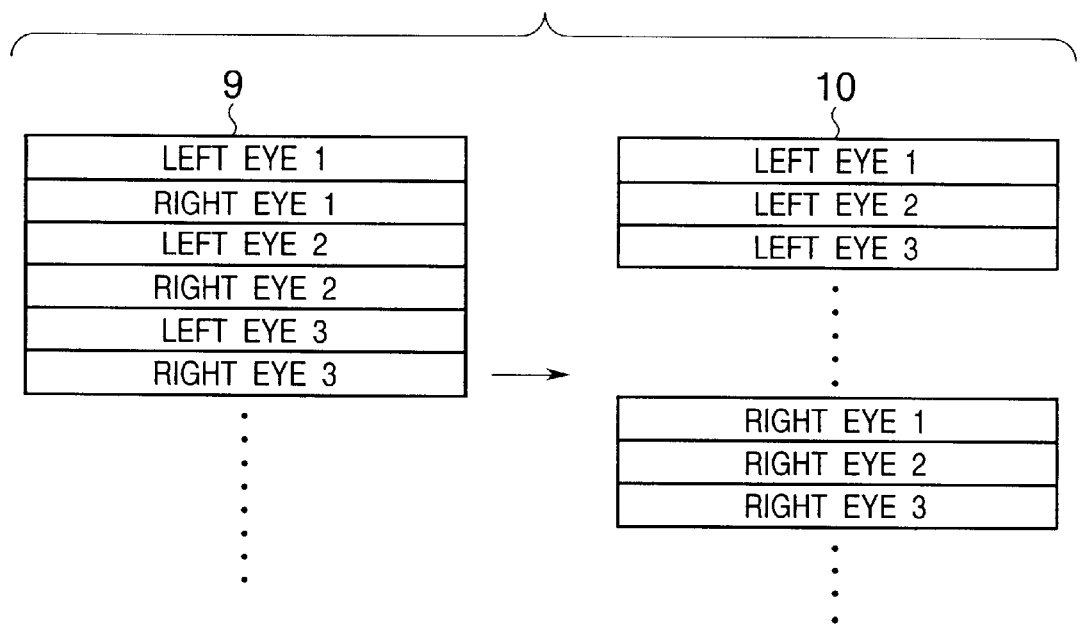
FIG. 3 is a view showing rearrangement of line sequential image data.

More specifically, video lines arranged in the order of left 1, right 1, left 2, left 2, . . . as indicated by "9" in FIG. 3 are rearranged into the order of left 1, left 2, . . . , right 1, right 2, . . . as indicated by "10" in FIG. 3, and a 1-frame stereoscopic video data area is finally segmented into upper and left blocks to rearrange the data area into two video blocks for the left and right eyes.

FIG. 3 shows this state. The image compressing unit 4 performs this processing. When the line sequential moving image 7 is captured, left-eye and right-eye video data are arranged every other line ("9" in FIG. 3).

In distributing video data like the above line sequential image to a network, if the data is directly compressed by JPEG or motion JPEG, a considerable deterioration in image quality occurs.

In general, since many of the pixels in each small block of the same image have similar colors, the image data can be compressed with little deterioration in image quality by using a redundant compression method based on the correlation between the respective blocks, e.g., JPEG. In the case of a line sequential image in which different images are present in the same block in units of lines, however, since the correlation between the respective blocks becomes low, a deterioration in image quality is more conspicuous than in the above case at the same compression ratio.

If, therefore, compression processing is performed after a data area is segmented into left-eye and right-eye video blocks to prevent different images from entering each small block in JPEG compression processing, a deterioration in image quality can be reduced.

Figure 4:
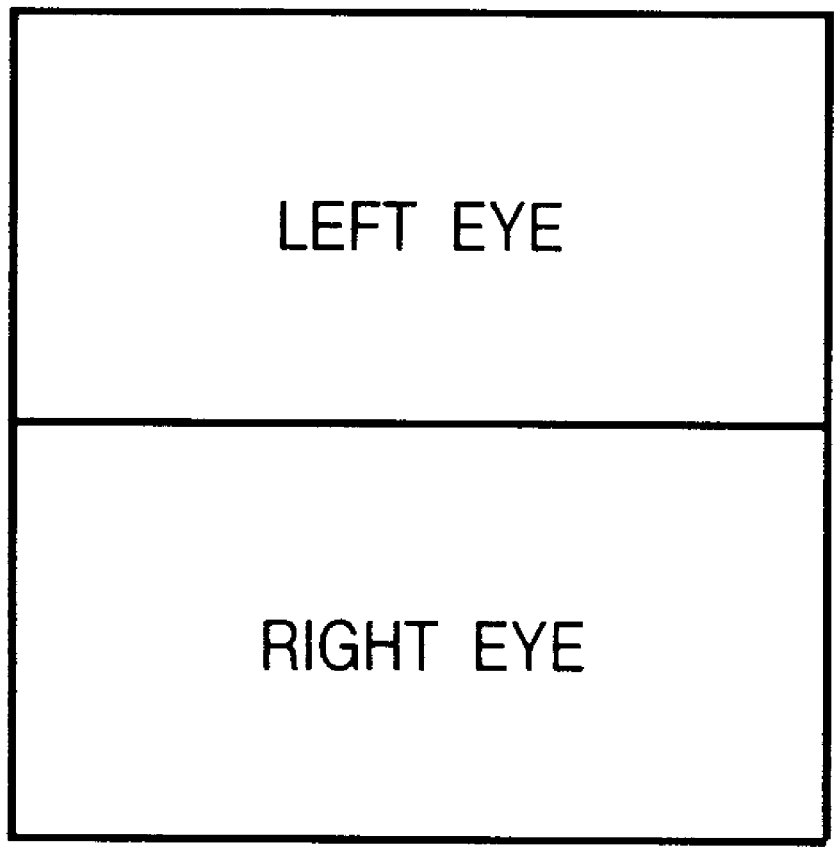
FIG. 4 is a view showing an image whose format is converted into a top-down split-screen format.

In this embodiment, as shown in FIG. 4, the format of stereoscopic video data is converted into a so-called top-down split-screen format in which a 1-frame stereoscopic video data area is segmented into upper and lower areas and assigned to two video blocks for the left and right eyes. However, a side-by-side split-screen format may be used. In either case, a deterioration in image quality can be prevented well as compared with the case wherein the line sequential moving image 7 is compressed by motion JPEG or the like.

The rearranged image is then sent to the image compressing unit 4 to be compressed. The data output unit 5 processes the compressed image data according to the format suited to data to be output to a network 8. The resultant data is sent to the network 8.

Figure 5:
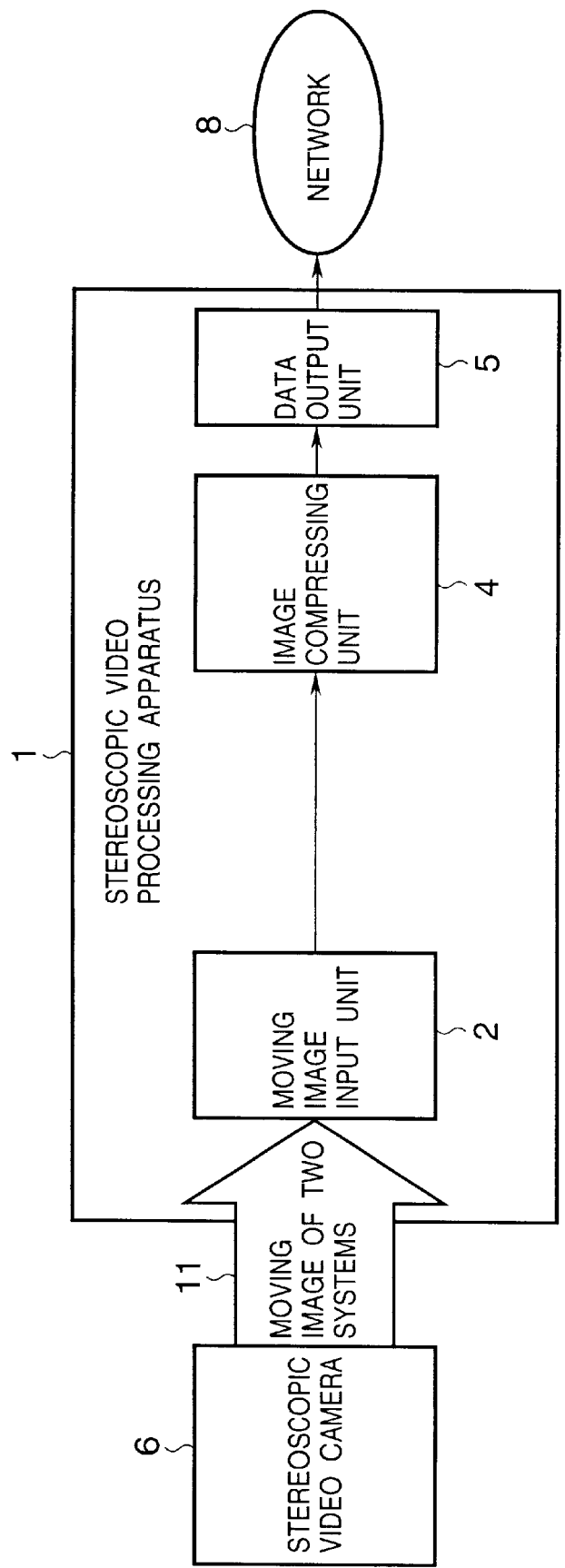
FIG. 5 is a block diagram showing an overview of the flow of stereoscopic video processing to be performed when stereoscopic video data of a top-down split-screen format is input.

FIG. 5 schematically shows the flow of stereoscopic video processing to be performed when top-down split-screen format stereoscopic video data is input.

In this case, the input video data is not segmented into left-eye and right-eye images but is one block of continuous data. Since this data can be compressed in units of frames of the block, a deterioration in image quality is less than that in the case wherein line sequential image data is directly compressed. For this reason, this data is compressed while the left and right images are kept combined with each other without any change in stereoscopic video format, and the compressed data is output to the network.

Figure 6:
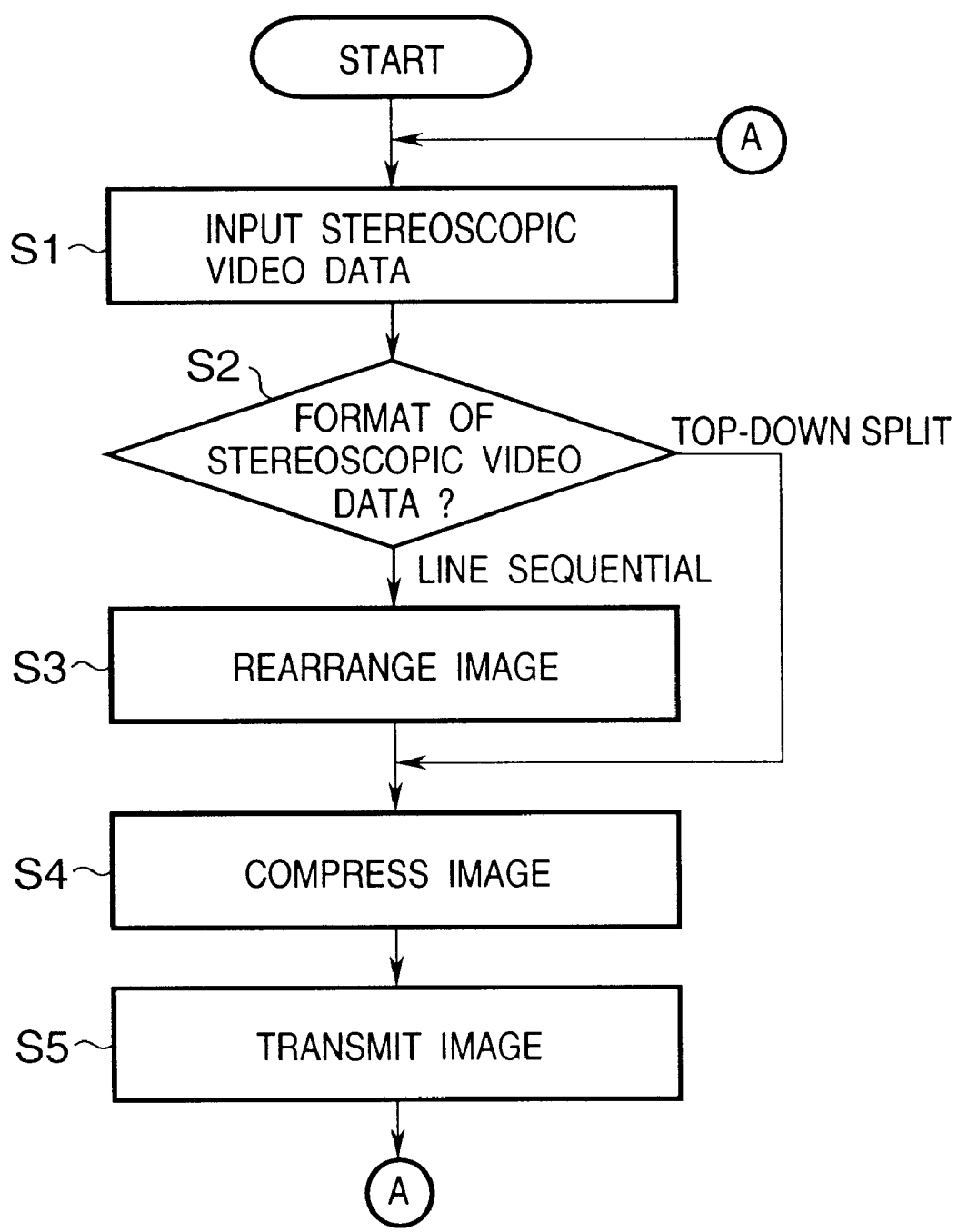
FIG. 6 is a flow chart showing a procedure in the first embodiment.

FIG. 6 is a flow chart showing a procedure in this embodiment.

First of all, in step S1, stereoscopic video data is input and stored in the memory or hard disk. In step S2, the format of the stereoscopic video data is discriminated. Note that the format may be discriminated by reading the information associated with the format and recorded in advance on the header portion of the data or in accordance with a direction from the user. Alternatively, information indicating what kind of video data is input is registered in the stereoscopic video processing apparatus in advance, and the format is discriminated by reading and determining the information.

If it is determined that the input stereoscopic video data is line sequential data, the flow advances to step S3 to rearrange the image as shown in FIG. 3. If it is determined that the data is top-down split-screen format stereoscopic video data, the flow skips step S3.

The flow advances to step S4 to compress the image data to transmit it to the network and packet the data. The flow then advances to step S5 to transmit the image data. Thereafter, the processing in step S1 and the subsequent steps is repeated.

As described above, ever if a plurality of types of stereoscopic video data are input, the format of each stereoscopic video data can be converted into a format compatible with the network.

In addition, ever if a plurality of types of stereoscopic video data are received through a network, the format of each stereoscopic video data can be converted into a format compatible with a display apparatus or the like.

In this embodiment, line sequential stereoscopic video data is converted into top-down split-screen format data. However, the present invention is not limited to this. For example, the format may be converted into the side-by-side split-screen format. That is, the format may be converted into an arbitrary format that can reduce a deterioration in image quality more than line sequential stereoscopic video data.

The format of input stereoscopic video data is not limited to the line sequential format and may be converted into an arbitrary format. The stereoscopic video processing apparatus may convert the format of input stereoscopic video data in accordance with the format of the stereoscopic video data and the format for output operation.

In the above embodiment, the stereoscopic video camera is used as a stereoscopic video input device of the stereoscopic video processing apparatus. This embodiment, however, may use stereoscopic video data obtained in advance instead of the stereoscopic video camera.

The sequence from the step of converting the video data sent from the camera to the step of outputting the data to the network has been described above. Obviously, however, the present invention can be applied to a case wherein a plurality of types of stereoscopic video data sent from a network are converted, and the converted data are output to the network.

Second Embodiment

In the first embodiment, the format of input stereoscopic video data is converted, and the resultant data is distributed to the network. In the second embodiment, data is converted in accordance with the format of stereoscopic video data that can be processed by a display device.

Figure 7:
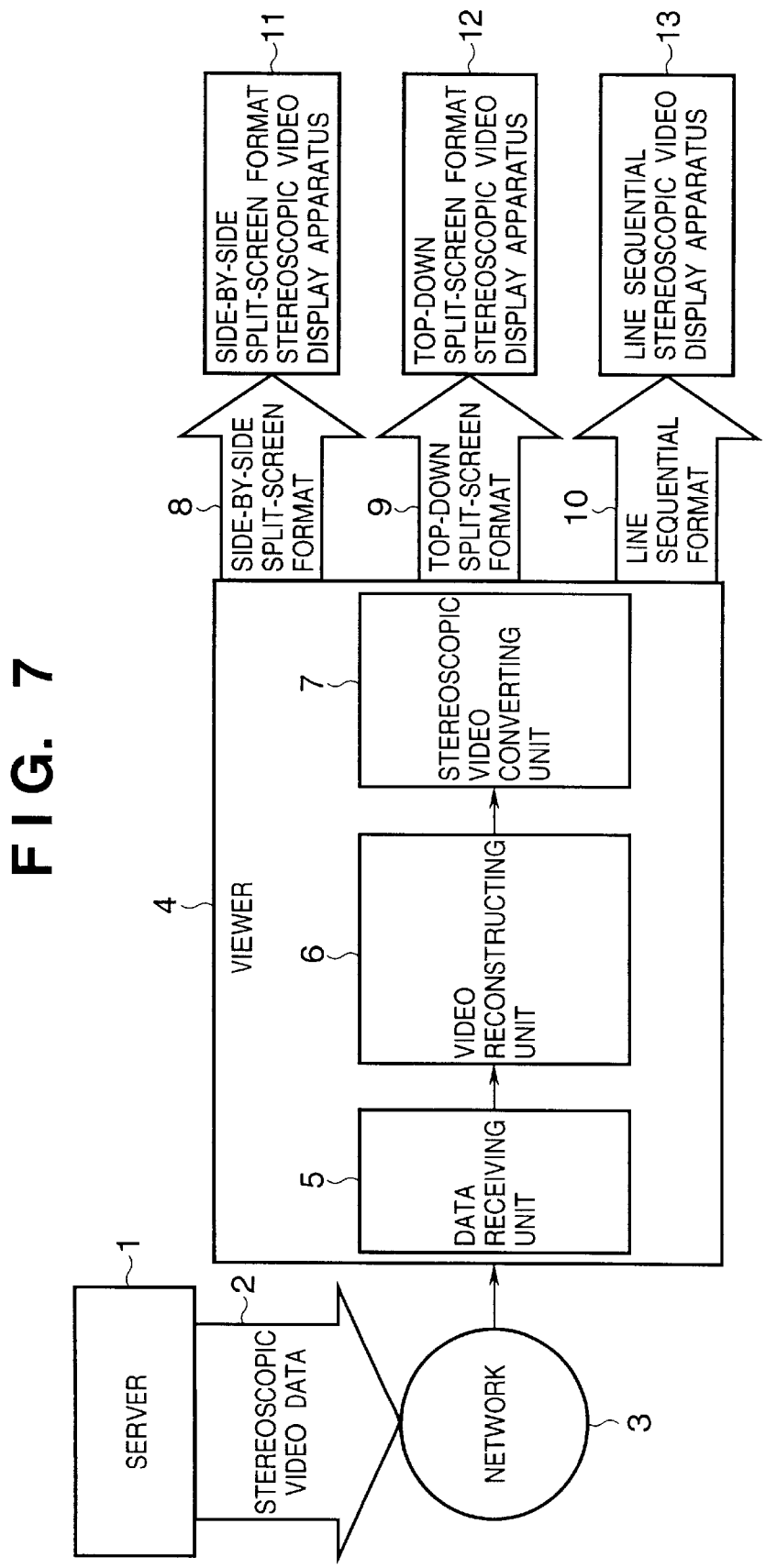
FIG. 7 is a block diagram showing the arrangement of a stereoscopic video processing apparatus according to the second embodiment.

FIG. 7 schematically shows the arrangement of this embodiment.

In this stereoscopic video processing apparatus, a server 1 for transmitting stereoscopic video data is connected to a viewer (client) 4 for displaying the stereoscopic video data through a network 3. A stereoscopic video display apparatus is connected to the viewer 4.

The flow of video data will be described next. Stereoscopic video data 2 sent from the server 1 is the data obtained by synthesizing left-eye and right-eye video data into one video data upon synchronizing the two data and compressing the data to supply it to the network 3. The server 1 transmits this stereoscopic video data 2 to the network 3.

The viewer 4 receives the data flowing through the network 3. The viewer 4 is made up of three software modules, namely a data receiving unit 5, video reconstructing unit 6, and stereoscopic video converting unit 7. The data receiving unit 5 receives, for example, the stereoscopic video data 2 packeted from the network 3 and transfers the data to the video reconstructing unit 6. The video reconstructing unit 6 reconstructs the packet data into the original video data which is a mixture of left-eye and right-eye video data.

Figure 9:
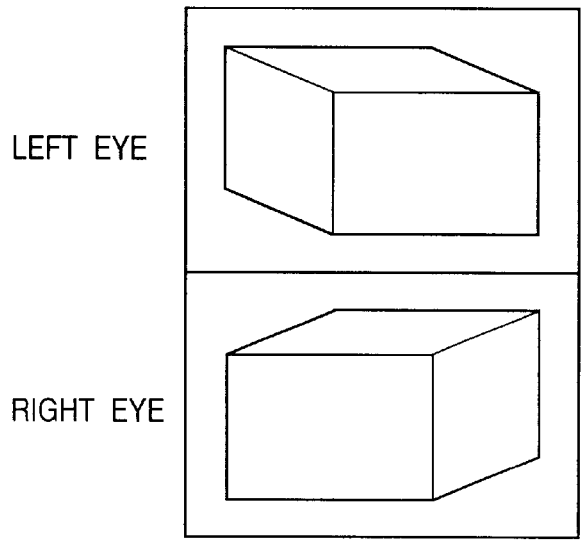
FIG. 9 is a view showing one frame of original stereoscopic video data.

FIG. 9 shows an example of the reconstructed stereoscopic video data. In this case, the above top-down split-screen format is used. If the data sent from the server contains stereoscopic video format information, the data is automatically reconstructed according to the format. If no format information is contained, the data is reconstructed according to the format designated by the user or one of the formats registered in the apparatus in advance. The reconstructed video data is transferred to the stereoscopic video converting unit 7.

The stereoscopic video converting unit 7 converts the format of the data into a format compatible with the stereoscopic video display apparatus, as needed, and outputs the resultant data.

More specifically, if the stereoscopic video format sent from the server coincides with the format used by the display apparatus on the viewer side, the data can be directly display without format conversion. If the formats differ from each other, the format of the data is converted into the format on the viewer side.

This embodiment uses the following three stereoscopic video display formats. These formats will be described below.

Figure 8:
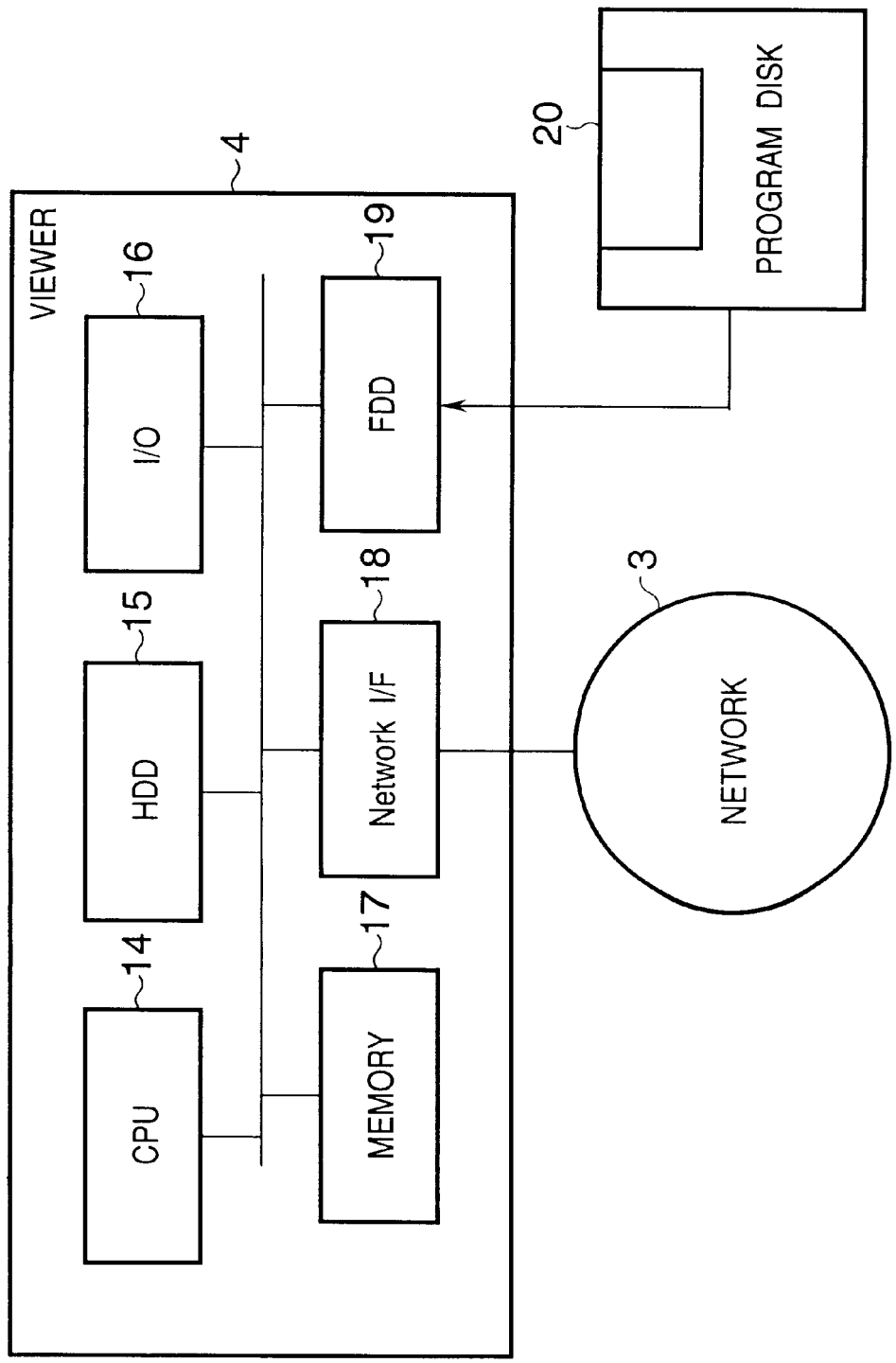
FIG. 8 is a block diagram showing the hardware arrangement of a viewer and a program input method.
Figure 10:
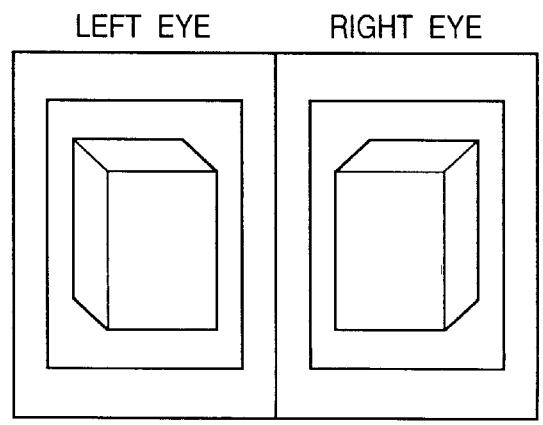
FIG. 10 is a view showing an image to be output to a side-by-side split-screen format stereoscopic display apparatus.

The side-by-side split-screen format denoted by reference numeral 8 in FIG. 7 is the format in which left-eye video data is output to the screen output left side; and right-eye video data, to the screen output right side, as shown in FIG. 10. Assume that the original stereoscopic video data in FIG. 8 is to be converted according to this format. According to a conversion method, the video data is segmented into left-eye video data and right-eye video data, and each segmented data is reduced to ½ in the horizontal direction. The left-eye video data is then positioned on the screen output left side; and the right-eye video data, on the screen output right side at a position corresponding to the left-eye video data. This video data is sent to a side-by-side split-screen format stereoscopic video display apparatus 11 to perform stereoscopic video display.

Figure 11:
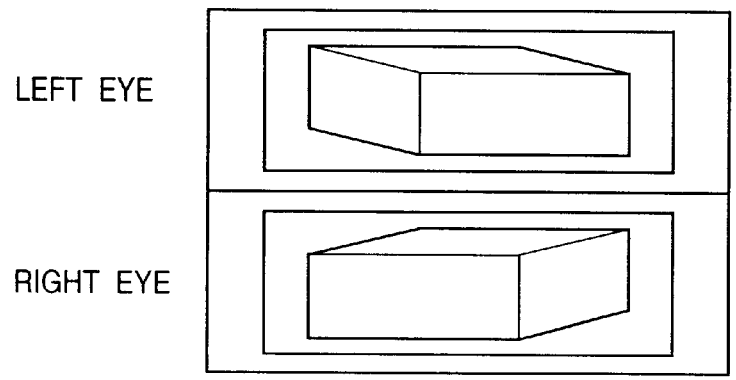
FIG. 11 is a view showing an image to be output to a top-down split-screen format stereoscopic video display apparatus.

The top-down split-screen format denoted by reference numeral 9 in FIG. 7 is the format in which left-eye video data is output to the screen output upper side; and the right-eye video data, to the screen output lower side, as shown in FIG. 11. Assume that the original stereoscopic video data in FIG. 9 is to be converted according to this format. According to a conversion method, the video data is segmented into left-eye video data and right-eye video data, and each segmented video data is reduced to ½ in the vertical direction. The left-eye video data is then positioned on the screen output upper side; and the right-eye video data, on the screen output lower side at a position corresponding to the left-eye video data. This video-data is sent to a top-down split-screen format stereoscopic video display apparatus 12 to perform stereoscopic video display.

Figure 12:
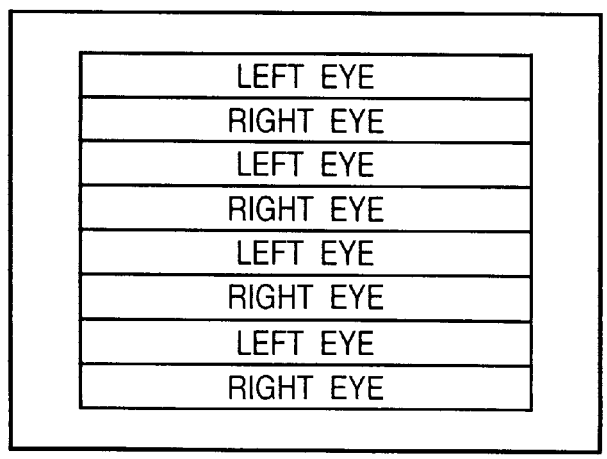
FIG. 12 is a view showing an image to be output to a line sequential stereoscopic video display apparatus.

The line sequential format denoted by reference numeral 10 in FIG. 7 is the format in which left-eye and right-eye video data like those shown in FIG. 12 are alternately switched and output in units of horizontal lines, as in the format described in the first embodiment. Assume that the original stereoscopic video data in FIG. 9 is to be converted according to this format. According to a conversion method, the video data is segmented into left-eye and right-eye video data, and each segmented video data is reduced to ½ in the vertical direction. These video data are extracted horizontally line by line, and the left-eye and right-eye video data are alternately arranged on ever and odd horizontal lines. This video data is sent to a line sequential stereoscopic video display apparatus 13 to perform stereoscopic video display.

The above program on the viewer side is supplied to the viewer 4 through a medium such as a floppy disk. FIG. 8 shows such a case. The viewer 4 is comprised of a CPU 14, HDD (Hard Disk Drive) 15, I/O 16, memory 17, network I/F 18, FDD (Floppy Disk Drive) 19, and the like. The viewer 4 is connected to the network 3. The above stereoscopic video display apparatus is connected to the network 3. A floppy disk 20 in which the program is stored supplies the program to the HDD 15 or memory 17 through the FDD 19.

As is obvious from FIG. 8 as well, the viewer 4 can be implemented by a general-purpose information processing apparatus such as a personal computer.

Figure 15:
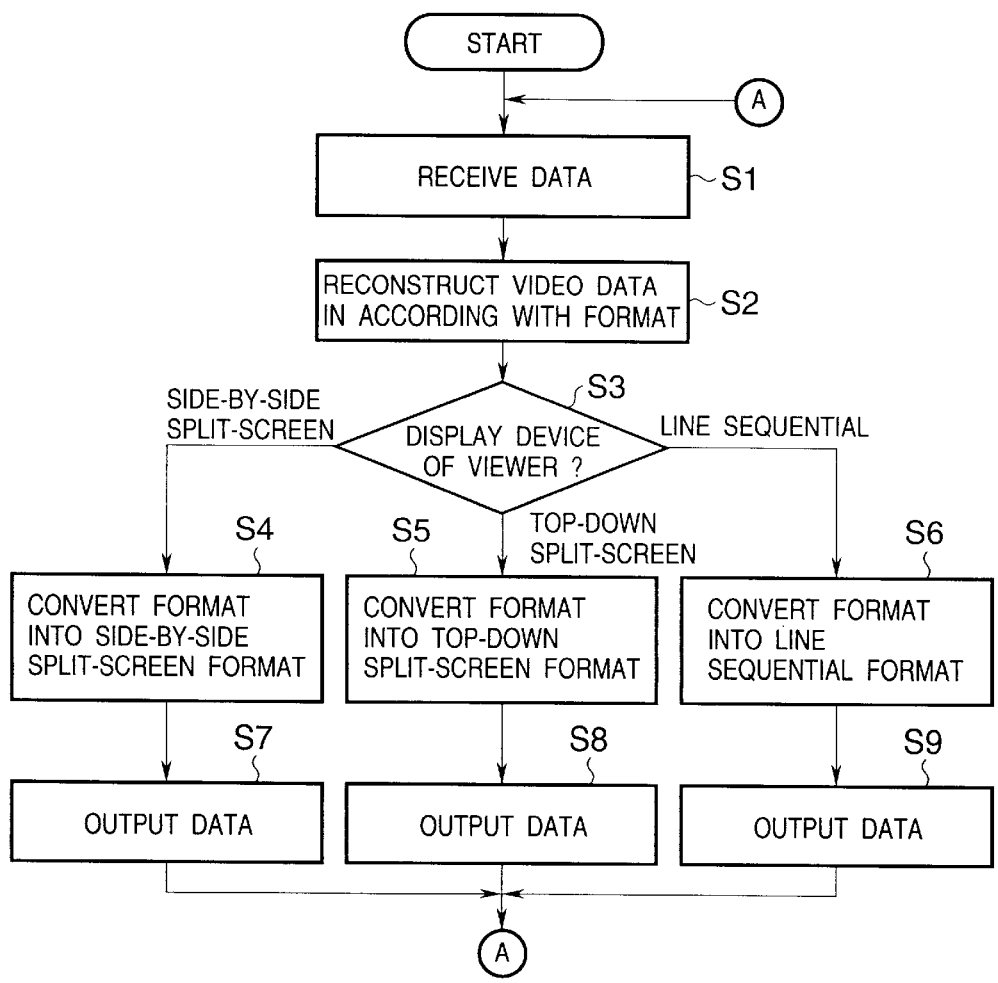
FIG. 15 is a flow chart showing an operation procedure of the viewer in the second embodiment.

FIG. 15 is a flow chart showing a procedure on the viewer side.

First of all, in step S1, the data transferred from the server is received. The flow advances to step S2 to decompress the received data and reconstruct video data in accordance with the format information contained in the data.

In step S3, the currently connected display device is determined. This determination processing is performed by registering information indicating what kinds of display device are connected to the viewer is registered in the viewer in advance, and reading out the information. Alternatively, in order to determine a format corresponding to one of the display devices connected to the viewer which can display stereoscopic video data, for example, the type of format of stereoscopic video data that can be displayed is registered in the viewer in advance, and this information is read out.

Since this embodiment corresponds to three types of display devices, the flow branches to one of steps S4 to S6 in accordance with the determination result in step S3 to convert the data into stereoscopic video data complying with the corresponding display device. The converted stereoscopic image is output to the corresponding output apparatus in a corresponding one of steps S7 to S9. The processing in step S1 and the subsequent steps is then repeated.

Figure 13:
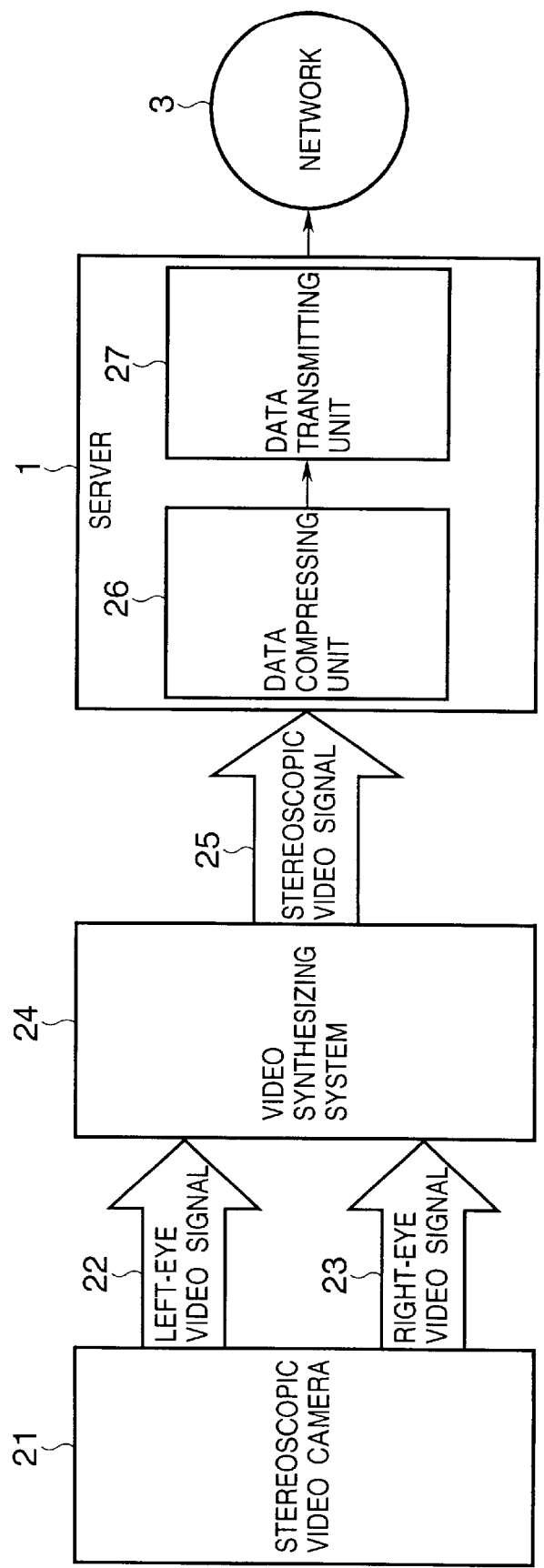
FIG. 13 is a block diagram showing the arrangement of a server in the second embodiment.

FIG. 13 shows an example of the video conversion route from a stereoscopic video camera 21 to the server 1. The stereoscopic video camera 21 has two image sensing means for respectively outputting a left-eye video signal 22 and right-eye video signal 23. The two signals are input to a video synthesizing system 24 to be synthesized, and the resultant signal is output as one stereoscopic video signal 25 (for example, two images as stereoscopic images are reduced to ½ in the vertical direction, and the reduced images are vertically connected to each other to form one video data). The stereoscopic video signal 25 is input to the server 1. The server 1 is made up of two software modules, namely a data compressing unit 26 and data transmitting unit 27. The data compressing unit 26 compresses the received stereoscopic video signal 25 and transfers it to the data transmitting unit 27. The data transmitting unit 27 receives the compressed signal and transmits it to the network 3.

Figure 14:
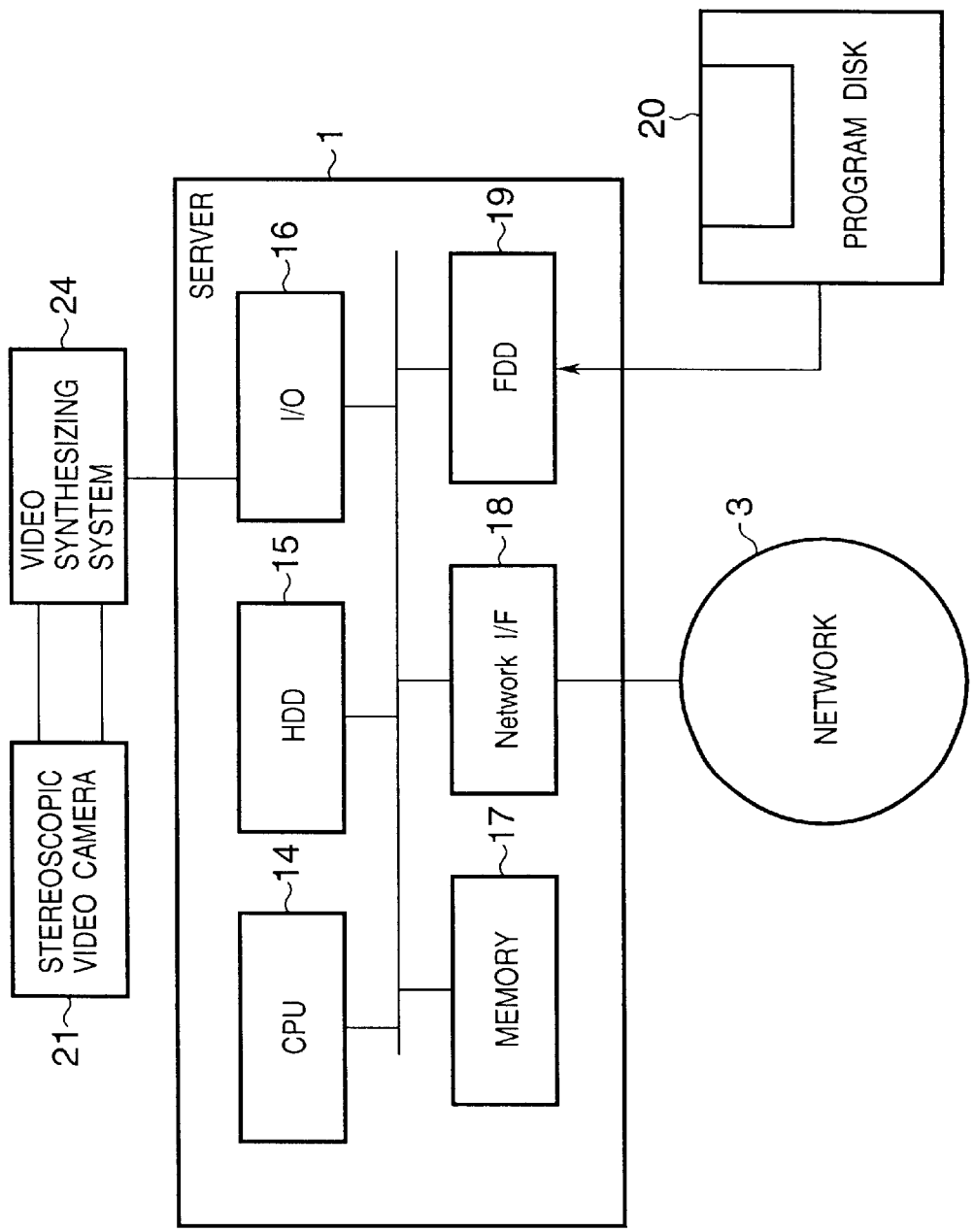
FIG. 14 is a block diagram showing the hardware arrangement of a camera server and a program input method.

FIG. 14 shows the hardware arrangement of the camera server and a program input method. The video synthesizing system 24 is made of software or hardware for implementing a video synthesizing function and video magnifying function for the video data sent from the stereoscopic video camera 21. These functions may be incorporated in the CPU 14 or server 1.

The above program on the server side is supplied to the server through a medium such as a floppy disk. FIG. 14 shows this state. Although much of the following description overlaps the description of the arrangement of the apparatus of the first embodiment, the arrangement of the apparatus of the second embodiment will be described below.

The server is comprised of the CPU 14, HDD (Hard Disk Drive) 15, I/O 16, memory 17, network I/F 18, FDD (Floppy Disk Drive) 19, and the like. The server is connected to the network 3 through the video synthesizing system 24. The floppy disk 20 in which a program is stored supplies the program to the HDD 15 or memory 17 through the FDD 19.

In this embodiment, a stereoscopic video camera is used as an input device for stereoscopic video data on the server side. The embodiment, however, may load stereoscopic video data from a file instead of the stereoscopic video camera and transmit it.

In this embodiment, a file in which stereoscopic video data is stored is placed on the server side. However, this file may be placed on the viewer side to play back the stereoscopic video data without the mediacy of a network.

Furthermore, as described in the above embodiment, the sever and viewer (client) require a certain amount of hardware such as a network interface and camera. However, these components can operate on the basis of a general-purpose information processing apparatus such as a personal computer.

Third Embodiment

In this embodiment, the quality of stereoscopic video data generated or transmitted by the above apparatus is further improved in addition to use of the above apparatus.

In a stereoscopic video processing apparatus like the one described above, depending on the AE (Automatic Exposure) function of each video camera, when obtained stereoscopic video data is played back, video data having different brightness levels may be presented to the left and right eyes of an observer, or when stereoscopic video data is transmitted/received through a network, data may be lost due to some troubles in the process of communication, and left-eye and right-eye video data go out of balance. This may make the stereoscopic video data look incongruent.

This embodiment is made to solve the above problems.

For reference purposes, an apparatus will be described first, which is designed to compare the two video data captured by a video distributing apparatus (camera server) capable of capturing the two video signals (stereoscopic video signals) obtained by two juxtaposed video cameras, correct the brightness levels of the video data so as to make corresponding portions of the respective video data have similar luminance values, synthesize the corrected two video data into one stereoscopic video data by reducing and coupling them, and transmit the stereoscopic video data to a remote terminal (client) through a network.

Figure 16:
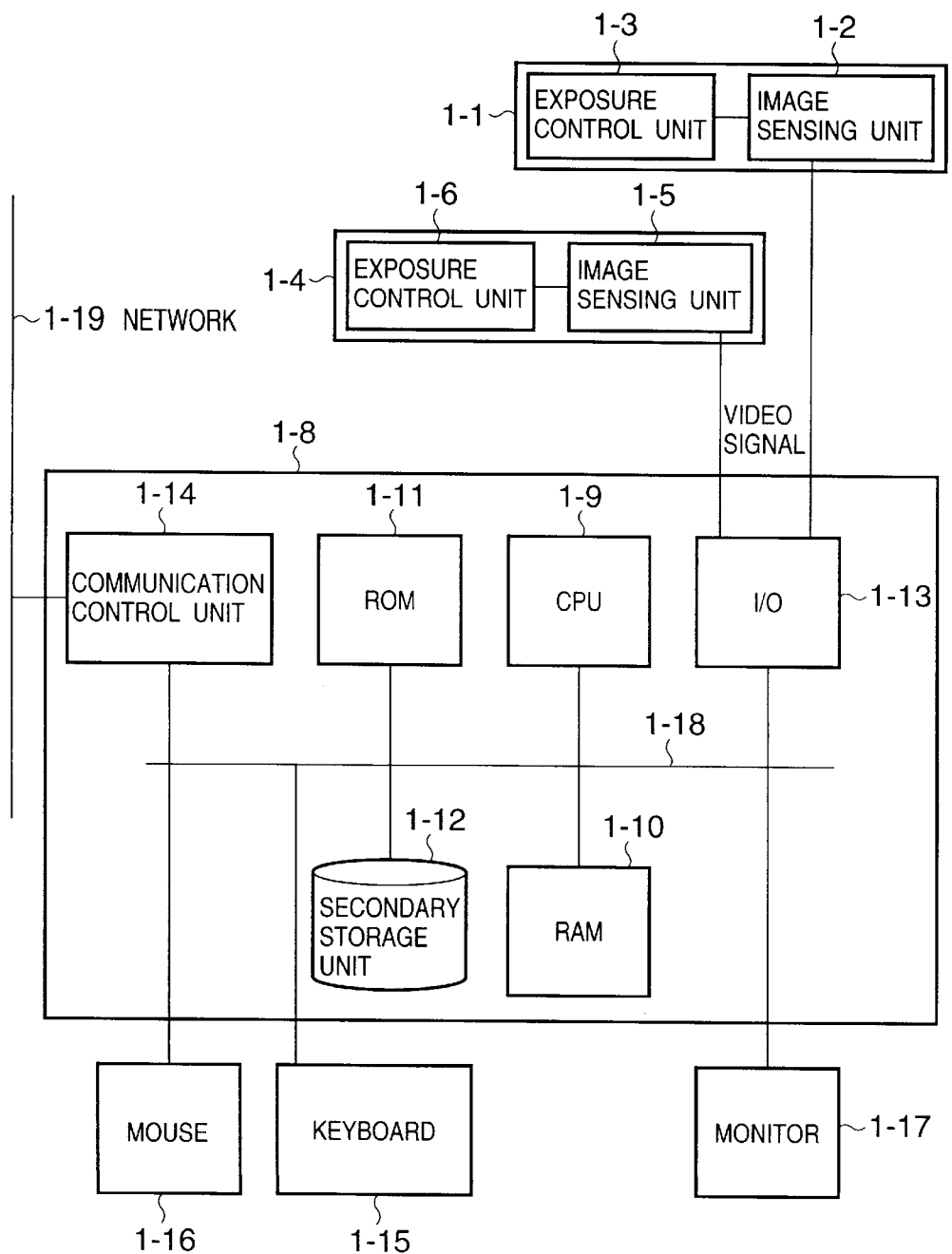
FIG. 16 is a block diagram showing the schematic arrangement of the third embodiment.

Referring to FIG. 16, this video distributing apparatus is comprised of image sensing apparatuses 1—1 and 1–4 and video processing apparatus 1–8. The video processing apparatus 1–8 has hardware for obtaining (capturing) video data from the video camera, and can be implemented by a general-purpose information processing apparatus (e.g., personal computer) and software.

The image sensing apparatus 1—1 is comprised of an image sensing unit 1–2 (1–5) for inputting video data and an exposure control unit 1–3 (1–6) for automatically determining an exposure state in imaging sensing operation (ditto for the image sensing apparatus 1–4). As parameters for determining this exposure state, a shutter speed, iris, gain, white balance, and the like are conceivable, but are not specified in this case. For the sake of simplicity, these parameters will be simply referred to as exposure parameters hereinafter.

The video output signal from the image sensing unit 1–2 (1–5) is based on the NTSC scheme, YC separation scheme, or the like. The video data are sequentially stored in a RAM 1–10 in the video processing apparatus 1–8 through an I/O unit 1–13 of the video processing apparatus 1–8. Assume that the I/O unit 1–13 has appropriate interfaces of two systems, e.g., so-called capture boards, which can capture video data in real time.

Each of the exposure control units 1–3 and 1–6 has the function of automatically adjusting the lightness balance of the overall frame in the process of image sensing. The exposure control units 1–3 and 1–6 can refer to the luminance signals obtained by the image sensing units 1–2 and 1–5 through control signal lines, and instruct the image sensing units 1–2 and 1–5 to perform image sensing by using the optimal exposure parameters calculated on the basis of the referred information.

The image sensing apparatuses 1—1 and 1–4 having the image sensing units 1–2 and 1–5 and exposure control units 1–3 and 1–6 can be easily implemented by the camera modules incorporated in home video cameras.

The video processing apparatus 1–8 has the following arrangement including a CPU 1–9 for controlling the overall apparatus and a RAM 1–10 which is used as the work area of the CPU 1–9 and in which applications and the like serving as an OS and camera server are loaded to be executed.

Reference numeral 1–11 denotes a ROM in which a boot program and BIOS are stored; 1–12, a secondary storage unit (hard disk drive or the like) in which programs and the like serving as an OS and camera server are stored; 1–13, an I/O unit for performing communication between the image sensing apparatuses 1—1 and 1–4; 1–14, a communication control unit for transmitting/receiving stereoscopic video data to/from a remote place; and 1–18, a bus for connecting the above processing units. The video processing apparatus 1–8 can be implemented by a general-purpose computer, as described above. A keyboard 1–15, pointing device 1–16 such as a mouse, and video monitor 1–17 are connected to the bus 1–18.

The video monitor 1–17 can display the images obtained by the image sensing apparatuses 1—1 and 1–4 and generated as stereoscopic video data and the stereoscopic video data received through a network.

First of all, the video processing apparatus 1–8 generates stereoscopic video data by performing processing (to be described later) for the video data of two systems obtained by the image sensing apparatuses 1—1 and 1–4. The video processing apparatus 1–8 then transmits the stereoscopic video data to a remote terminal (client) through the network 1–19.

Figure 17A:
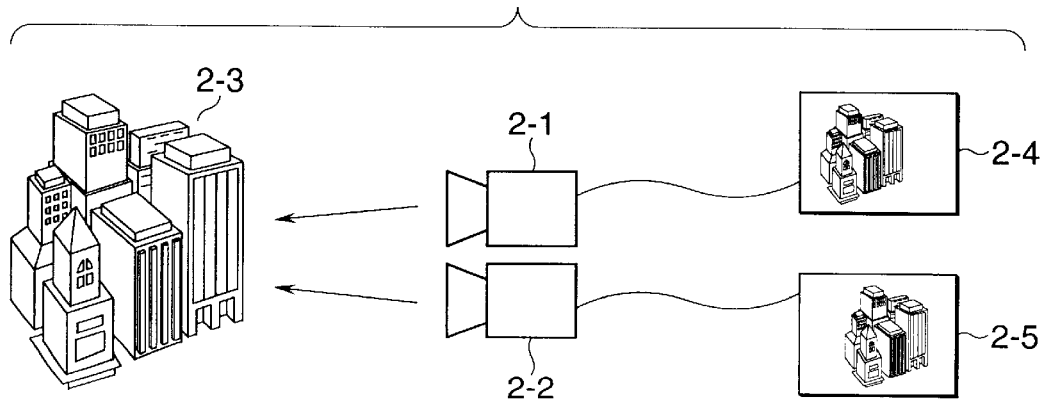
FIGS. 17A and 17B are views for explaining the basic principle of the third embodiment.

FIG. 17A shows how two juxtaposed video cameras are simultaneously image-sensing a given scene. Reference numerals 2–1 and 2—2 denote video cameras, which correspond to the image sensing apparatuses 1—1 and 1–4 in FIG. 16; 2–3, the scene image-sensed by the two video cameras; and 2–4 and 2–5, video data represented by video signals corresponding to the scene image-sensed by the video cameras 2–1 and 2—2 at a given time point.

Since the two video cameras 2-1 and 2—2 are image-sensing at different positions, the scene 2-3 looks slightly different at the video data 2-4 and 2-5. In addition, the correct exposure determination results obtained by the exposure control units 1-3 and 1-6 incorporated in the video cameras 2-1 and 2—2 differ from each other, or the overall frames of the video data 2-4 and 2-5 also differ in brightness owing to the differences in characteristics between the video cameras 2-1 and 2—2 themselves.

Figure 17B:
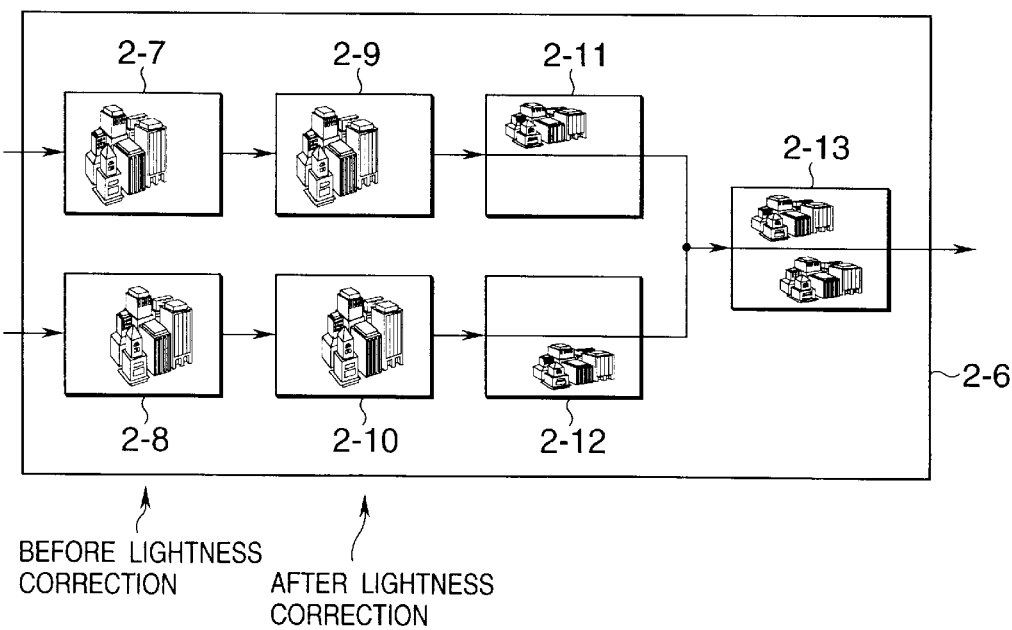

FIG. 17B shows the principle of generating stereoscopic video data by inputting the video signals of the two system in FIG. 17A to the video processing apparatus 1-8.

Referring to FIG. 17B, "2-6" corresponds to the video processing apparatus 1-8. FIG. 17B schematically shows how the video data of the two systems input to the apparatus is processed and output. Reference numerals 2-7 and 2-8 denote video data of two systems which are obtained by the video cameras 2-1 and 2—2, captured by the I/O unit 1-13, and stored in the RAM 1-10. Video data 2-9 and 2-10 are obtained by checking the correspondence between these video data of the two systems by a known image processing technique of obtaining the correspondence with which the maximum cross-correlation value is obtained, and correcting corresponding portions to have the same brightness.

Video data 2-11 and 2-12 are obtained by reducing these video data to ½ only in the vertical direction by a known image processing technique as well. Finally, video data 2-13 is obtained by synthesizing the compressed video data 2-11 and 2-12 of the two systems into one video data. This finally generated video data 2-13 is transmitted to the remote terminal through the network.

The program for implementing the above processing is stored in the secondary storage unit 1-12. This program is loaded into the RAM 1-10 to be executed by the CPU 1-9. Obviously, however, the program may be stored in ROM to form a dedicated apparatus.

The processing of receiving stereoscopic video data through a network and displaying stereoscopic video data on the stereoscopic video display apparatus will be described next.

Upon reception of stereoscopic video data of the top-down split-screen format like the video data 2-13, the video processing apparatus 1-8 segments the video data into two video data in the vertical direction, and enlarges the two video data by two times in the vertical direction.

The video processing apparatus 1-8 then checks the correspondence between the video data of the two systems obtained in this manner by a known image processing technique of obtaining the correlation with which the maximum cross-correlation value is obtained, and correcting corresponding portions to have the same brightness. The correction processing is performed again in this case for the following reason. Even if the two video data are made to have the same brightness before being distributed to a network, some trouble (e.g., packet losses) may occur during transmission through the network. As a result, part of the data is lost. In this case, when the stereoscopic video data is played back, there is a possibility that the left-eye and right-eye images differ in brightness, and a sense of incongruity is produced.

As display methods, various methods are conceivable, e.g., methods using a head mounted display, renticular screen, liquid crystal shutter, polarizing glasses, and the like. However, any display method is not specified because it is not essential to the present invention.

Although a case wherein brightness correction is performed by an apparatus for transmitting stereoscopic video data will be described below, brightness correction on the data receiving end is also effective when problems are posed in terms of data loss and the like in a network.

Figure 18:
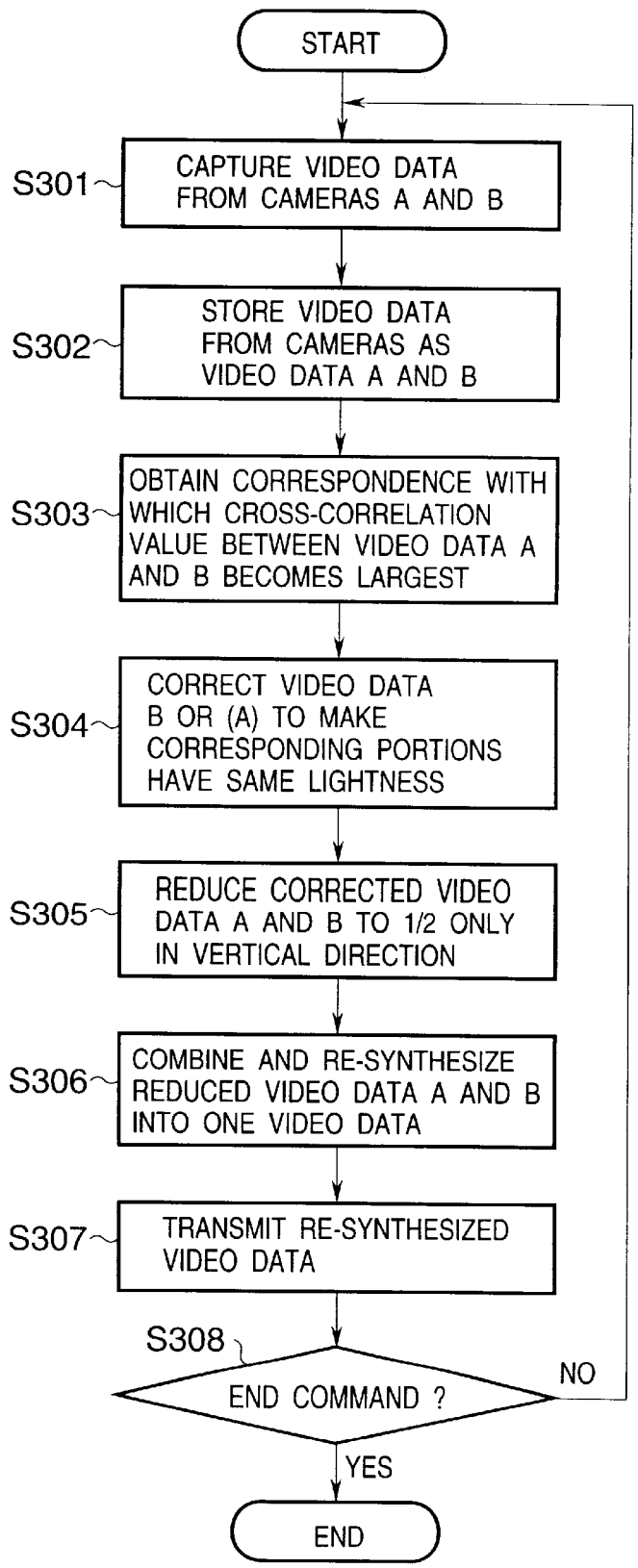
FIG. 18 is a flow chart showing an operation procedure of an apparatus in the third embodiment.

FIG. 18 is a flow chart showing the basic procedure in the video processing apparatus of this embodiment. As a whole, the video data of the two systems obtained by two video cameras are made to have uniform brightness, the two video data are combined and re-synthesized into one video data, and the resultant video data is transmitted.

First of all, the video data of the two systems obtained by the two video cameras 1—1 and 1-4 are input to the video processing apparatus 1-8 (step S301). This operation is performed through the I/O unit 1-13 of the video processing apparatus 1-8. The input video data of the two systems are immediately stored in the RAM 1-10 (or secondary storage unit 1-12) (step S302). In step S303, the correspondence between the video data of the two systems stored in the RAM 1-10 (or secondary storage unit 1-12) is obtained by using the cross-relation value between the video data. In this case, the cross-correlation value between the two video data is calculated, and the correspondence with which the maximum cross-correlation value can be obtained is obtained, thereby extracting the correspondence between the two video data. In step S304, lightness correction is performed by using the correspondence between the obtained video data of the two systems such that the two video data have the same lightness. In this case, the lightness correction amount of the video data is calculated by comparing the pieces of luminance information of corresponding portions of the video data, and lightness correction of one (or both) of the video data is performed in accordance with the correction amount.

Each of the video data of the two systems made to have the same lightness is reduced to ½ in the vertical direction (step S305). The reduced video data of the two systems are vertically combined and re-synthesized into one video data (step S306). These processes can also be implemented by a known image processing technique. The stereoscopic video data generated in this manner is transmitted to a remote place through the network 1-19 (step S307).

The processing in steps S305 and S306 is performed for the following purpose. Since video data of two systems are a pair of stereoscopic video data, if they are separately transmitted, the video data must be synchronized with each other on the receiving end, or a trouble arises for stereoscopic video data when one of the video data is lost during transmission through the network. The above processing is performed to minimize such inconvenience.

Several methods can be used to correct the lightness of video data of two systems on the basis of the correspondence between the two video data in the processing in step S304. One of these methods will be briefly described below.

When the correspondence with which the cross-correlation value between two video data becomes the largest is obtained, only one piece of information indicating how the pixel position of one video data (to be referred to as video data A hereinafter) is offset from that of the other video data (to be referred to as video data B hereinafter) is obtained throughout the video data. This positional offset amount is represented by ($\delta x$, $\delta y$). Letting $A(x, y)$ be a pixel of the video data A and $B(x, y)$ be a pixel of the video data B, $A(x, y)$ corresponds to $B(x+\delta x, y+\delta y)$ (except that the pixel exceeds the boundary of the video data, as is obvious). The difference in luminance signal between $A(x, y)$ and $B(x+\delta x, y+\delta y)$ is obtained as $e(x, y)$ for each pixel of each video data by raster-scanning the video data A, and the average value of e(x, y) of the overall video data is obtained. This makes it possible to calculate the luminance value correction amount of each pixel of the video data B.

The above description is associated with the apparatus for correcting the lightness of the video data obtained by the two cameras, synthesizing the resultant data into stereoscopic video data, and distributing the data to the network. However, the above lightness correction can be performed when the received stereoscopic video data is played back.

A case wherein the video data obtained from a network is displayed without any sense of incongruity by correcting the right-eye and left-eye video data will be described below.

Figure 19:
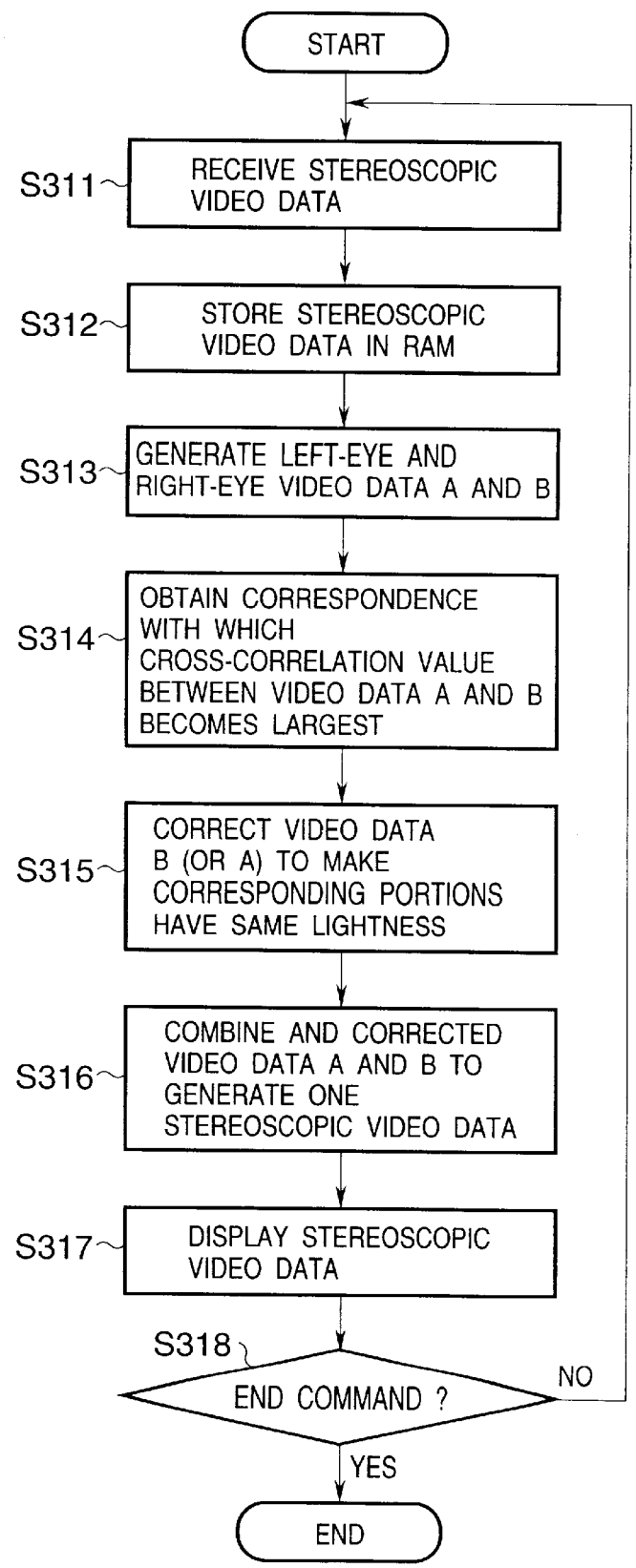
FIG. 19 is a flow chart showing an operation procedure in the third embodiment.

FIG. 19 is a flow chart showing a procedure for correcting right-eye and left-eye video data when the stereoscopic video data obtained from a network is to be displayed. As a whole, received stereoscopic video data is segmented into right-eye and left-eye video data, correction is performed such that corresponding portions of the two video data have the same lightness, and the resultant stereoscopic video data is displayed. Note that some of the following description overlaps that made with reference to FIG. 18.

First of all, stereoscopic video data is input from the network to the video processing apparatus 1–8 through the communication control unit 1–14 (step S311).

The input stereoscopic video data is immediately stored in the RAM 1–10 (or secondary storage unit 1–12) (step S312).

Right-eye and left-eye video data A and B are then generated from the input stereoscopic video data (step S313). The correspondence between the right-eye and left-eye video data A and B is obtained by using the cross-correlation value between the two data (step S314). In this case, the cross-correlation value between the two video data is calculated, and the correspondence with which the cross-correlation value becomes the largest is obtained, thereby extracting the correspondence between the two video data.

Lightness correction is performed to make the two video data have the same lightness by using the correspondence between the video data of the two systems which is obtained in step S314 (step S315). More specifically, the lightness correction amount of the video data is calculated by comparing the pieces of luminance information of corresponding portions in the video data, and the lightness of one (or both) of the video data is corrected by using the correction amount.

The stereoscopic video display apparatus generates stereoscopic video data from the right-eye and left-eye video data A and B, which are made to have the same lightness, so as to display the stereoscopic video data (step S316). These processes can also be implemented by a known image processing technique.

The generated stereoscopic video data is displayed on the monitor (step S317).

The processing in steps S315 and S316 is performed for the following purpose. Since video data of two systems are a pair of stereoscopic video data, if they are separately transmitted, the video data must be synchronized with each other on the receiving end, or a trouble arises for stereoscopic video data when one of the video data is lost during transmission through the network. The above processing is performed to minimize such inconvenience.

As a method of correcting the lightnesses of video data of two systems on the basis of the correspondence between the two video data in the processing in step S314, the same method as that used in step S304 in FIG. 18 may be used.

The above description is about an example of the method of correcting the lightnesses of video data by using the correspondence with which the cross-correlation value between the video data becomes the largest. Obviously, this example is an example of very simple processing, and hence an improvement in correction precision can be further expected by an appropriate method.

As described above, the brightness levels of a pair of stereoscopic signals obtained from two video cameras can be made uniform by using the means for correcting the brightness levels of images constituting stereoscopic video data by comparing them. In addition, when stereoscopic video data is received, stereoscopic video data with little sense of incongruity can be provided.

In this embodiment, brightness correction is performed. However, color appearance correction or interpolation of video data losses may be performed.

Fourth Embodiment

The fourth embodiment will be described. In addition to the arrangement of the third embodiment, the fourth embodiment has a DSP (Digital Signal Processor) for implementing video signal processing by using hardware. By implementing image processing, which is relatively high in calculation cost, using hardware in this manner, the speed of video signal processing can be increased, and hence performance in terms of real-time operation can be improved.

Only a case wherein stereoscopic video data is generated from two cameras to be distributed to a network will be described below. Obviously, however, as described in the third embodiment, the present invention can also be applied to a case wherein the stereoscopic video data received from a network is displayed on a monitor.

Figure 20:
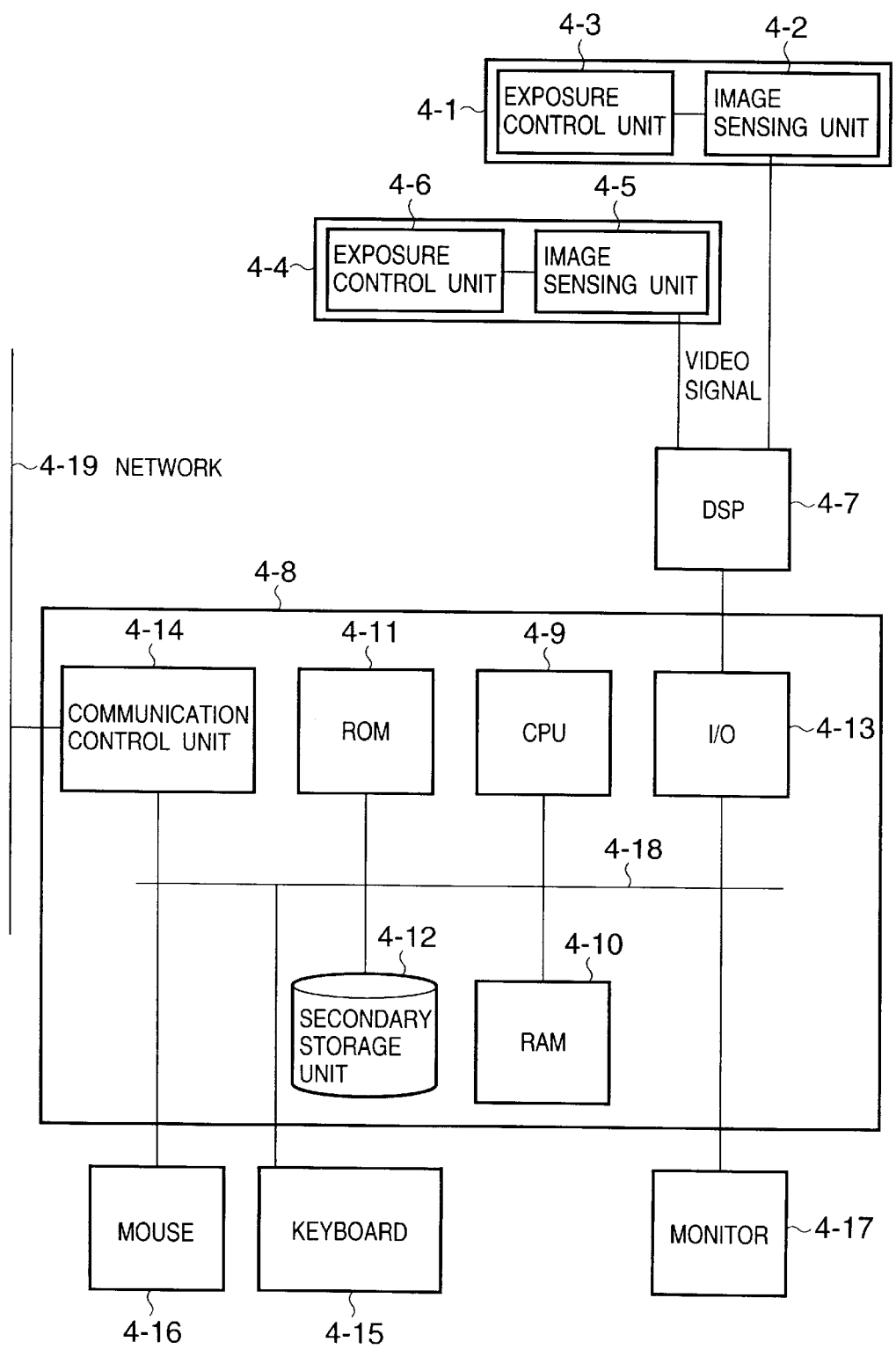
FIG. 20 is a block diagram showing the schematic arrangement of the fourth embodiment.

FIG. 20 is a block diagram showing the hardware arrangement of this embodiment. Only portions different from those in FIG. 16 will be described below. Referring to FIG. 20, a DSP 4–7 is provided between image sensing apparatuses 4–1 and 4—4 and a video processing apparatus 4–8. The DSP 4–7 is connected to the image sensing apparatuses 4–1 and 4—4 through video signal lines, and has the function of capturing video data of two systems obtained by the image sensing apparatuses 4–1 and 4—4 and executing video processing like that described in the third embodiment by means of hardware at high speed.

The basic principle and procedures in this embodiment comply with those in the third embodiment shown in FIGS. 17A to 18. Since high-speed video processing can be performed by using the DSP 4–7, this embodiment can implement an image processing technique with a calculation cost higher than that in the third embodiment. The third embodiment uses the method using the cross-correlation value of overall video data as a method of obtaining the correspondence between the video data. However, this embodiment uses a method of obtaining a correspondence by using a correspondence search.

According to the third embodiment, in the procedure (step S303 or S313), the method using a cross-correlation value is used as a method of obtaining the correspondence between video data throughout the video data. Although this method can be executed at a relatively low calculation cost and high speed, only one correspondence can be extracted from the overall video data. However, since the two image sensing apparatuses differ in their image sensing positions, the ways in which scenes from the two image sensing apparatuses look slightly differ from each other. It is therefore impossible that the all video data accurately correspond to each other. If the lightness data of portions that do not correspond to each other are used, accurate correction may not be performed.

This embodiment therefore changes this procedure (step S303 or S313) and uses a method of obtaining the correspondence between a plurality of video data in units of pixels (or blocks) instead of obtaining the correspondence of the overall video data. As this method, for example, a method called pattern matching is used. In this method, a small block is extracted from one video data, and the small block is moved within the other image. A portion having pixel value data coincide most with those in the small block is set as a corresponding portion. After a plurality of correction portions are obtained, the pieces of lightness information of these corresponding portions are acquired, and lightness correction is performed. With this processing, although the calculation amount increases, the precision can be greatly improved.

Since the present invention uses two juxtaposed image sensing apparatuses, calculation of corresponding portions can be facilitated if consideration is given to a method of arranging the image sensing apparatuses. High-precision calculation can therefore be performed without increasing the calculation load much, and effective operation can be expected.

Note that corresponding portions may be obtained by using a known method other than the above pattern matching.

With detection of corresponding portion by using the DSP and pattern matching described above, lightness correction at a higher speed and higher precision can be expected.

Fifth Embodiment

The fifth embodiment will be described.

In the third embodiment, a cross-correlation value is used to correct the lightnesses of the video data obtained by the two video cameras. In the fourth embodiment, corresponding portions are detected by using pattern matching. In fourth embodiment, in order to reduce the processing cost in the above embodiments, lightness correction is performed by using only histogram conversion of video data without obtaining the correspondence between the video data.

The hardware arrangement and basic principle of this embodiment comply with those of the third embodiment shown in FIGS. 16 to 17B.

Figure 21:
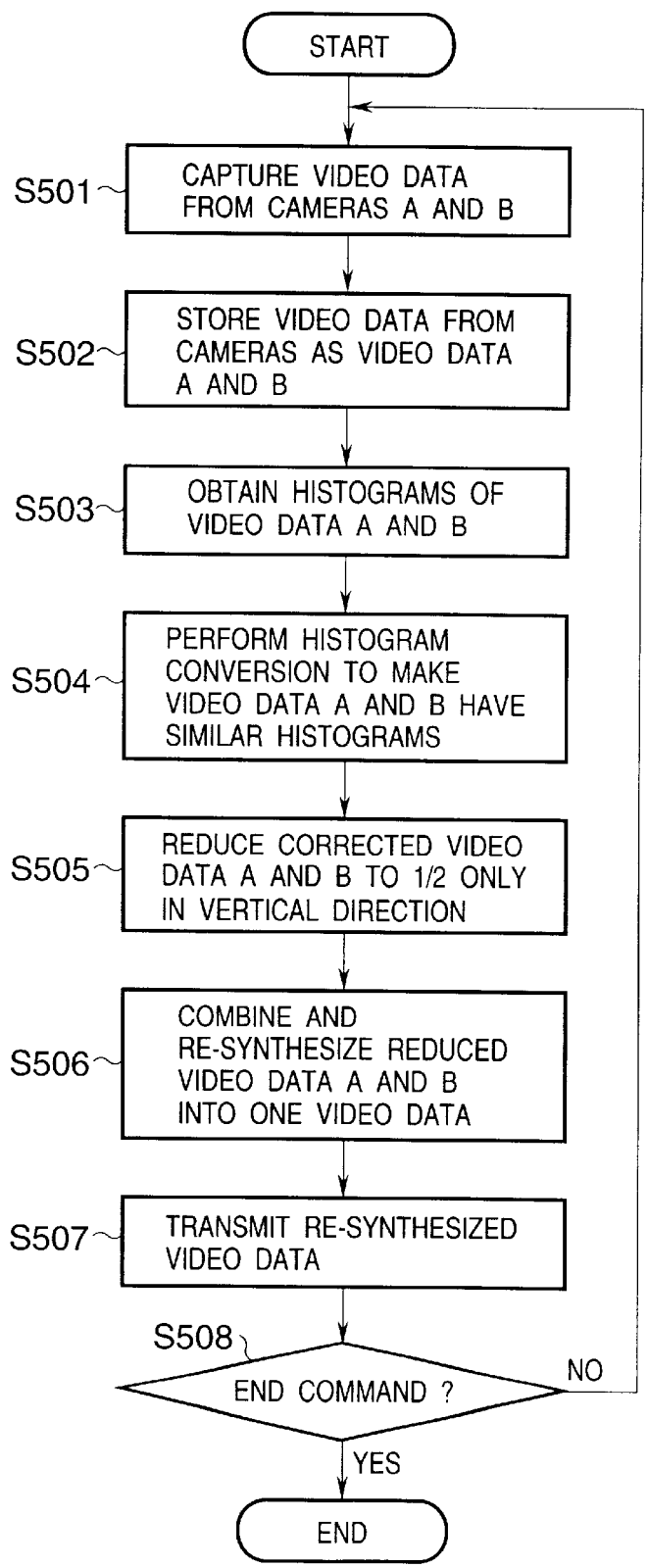
FIG. 21 is a flow chart showing a procedure in the fifth embodiment.

The procedure in this embodiment shown in FIG. 21 is similar to that in the third embodiment shown in FIG. 18. In this case, the brightness levels of the video data of the two systems obtained by two video cameras are made uniform, and the two video data are combined and re-synthesized into one video data to be transmitted.

The procedure in this embodiment shown in FIG. 22 is similar to that in the third embodiment shown in FIG. 19. In this case, when the video data obtained from a network are to be displayed, right-eye and left-eye video data are corrected. Only portions in FIGS. 21 and 22 which differ from those in FIGS. 18 and 19 will be described.

Steps S504 and S505 in the procedure in this embodiment correspond to steps S304 and S305 in the procedure in the third embodiment. In the third and fourth embodiments, the correspondence between video data is obtained, and lightness correction is performed on the basis of the correspondence. As described above, in this embodiment, the histograms of the two video data are obtained (step S504), and lightness correction is performed by performing histogram conversion of one (or both) of the video data (step S505).

Since histogram conversion is also a known image processing technique, a detailed description thereof will be omitted.

Likewise, steps S514 and S515 correspond to steps S314 and S315. In these steps, the histograms of two video data are obtained (step S514), and lightness correction is performed by performing histogram conversion of one (or both) of the video data (step S515).

A reduction in calculation cost can be attained by correcting the difference in lightness between video data using the above simple method without obtaining the correspondence between the video data, as described above. This makes it possible to realize light correction to a certain degree without using any expensive device such as a DSP.

In addition, in this embodiment, the video data obtained by a predetermined one of the image sensing apparatuses (one video camera) is corrected. However, a correction target may be dynamically determined. For example, when two video data A and B are obtained, and the overall luminance (total value) of the video data A is lower than that of the video data B, it means that the dynamic range of the video data A is narrower. In other words, the video data B has a wider dynamic range. Since the characteristics of the wider range include those of the narrower range in performing correction, the video data B is set as a correction target in this case.

All the above embodiments can be partly implemented by software. As described above, the video processing apparatus of each embodiment can be implemented by a general-purpose information processing apparatus. Therefore, the objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic video processing apparatus comprising:
   input means for inputting compressed stereoscopic image data, of which left-eye video and right-eye video are arrange in line-sequential order alternating every other line;

reconstruction means for reconstructing input stereoscopic image data;

discrimination means for discriminating a type of transfer format used for a display device;

a plurality of conversion means for converting the stereoscopic image data reconstructed by said reconstruction means into a respective one of a plurality of different formats, each format being a transfer format used for transferring data via a network, one of said plurality of conversion means converting the stereoscopic image data into side-by-side split-screen format for arranging the left-eye video and right-eye video in one video frame and another one of said plurality of conversion means converting the stereoscopic image data into top-down split-screen format for arranging the left-eye video and the right-eye video in one video frame;

selection means for selecting one of said plurality of conversion means on the basis of the discrimination result obtained by said discrimination means; and output means for outputting to the display device the stereoscopic image data converted by said one conversion means selected by said selection means.

2. The apparatus according to claim 1, wherein said input means receives stereoscopic video data through a network line.

3. The apparatus according to claim 1, wherein said input means comprises means for reading out data from a file.

4. A stereoscopic video processing method comprising:

an input step of inputting stereoscopic image data, of which left-eye video and right-eye video are arrange in line-sequential order alternating every other line;

a reconstruction step of reconstructing input stereoscopic image data;

a discrimination step of discriminating a type of transfer format used for a display device;

a conversion step of converting the stereoscopic image data reconstructed in the reconstruction step by one of a plurality of conversion means into a respective one of a plurality of different formats, each format being a transfer format used for transferring data via a network, one of the plurality of conversion means converting the stereoscopic image data into side-by-side split-screen format for arranging the left-eye video and right-eye video in one video frame and another one of the plurality of conversion means converting the stereoscopic image data into top-down split-screen format for arranging the left-eye video and the right-eye video in one video frame;

a selection step of selecting the one of the plurality of conversion means on the basis of the discrimination result obtained in the discrimination step; and an output step of outputting to the display device the stereoscopic image data converted in said conversion step by the one conversion means selected in the selection step.

5. A storage medium containing therein a program loaded and executed by a computer to process stereoscopic video data, the program comprising:

an input step of inputting stereoscopic image data, of which left-eye video and right-eye video are arrange in line-sequential order alternating every other line;

a reconstruction step of reconstructing input stereoscopic image data;

a discrimination step of discriminating a type of transfer format used for a display device;

a conversion step of converting the stereoscopic image data reconstructed in the reconstruction step by one of a plurality of conversion means into a respective one of a plurality of different formats, each format being a transfer format used for transferring data via a network, one of the plurality of conversion means converting the stereoscopic image data into side-by-side split-screen format for arranging the left-eye video and right-eye video in one video frame and another one of the plurality of conversion means converting the stereoscopic image data into top-down split-screen format for arranging the left-eye video and the fight-eye video in one video frame;

a selection step of selecting the one of the plurality of conversion means on the basis of the discrimination result obtained in the discrimination step; and an output step of outputting to the display device the stereoscopic image data converted in said conversion step by the one conversion means selected in the selection step.

* * * * *

UNITED STATES PATENT AND TRADEMARK OFFICE
CERTIFICATE OF CORRECTION

PATENT NO. : 6,704,042 B2
DATED : March 9, 2004
INVENTOR(S) : Taichi Matsui et al.

It is certified that error appears in the above-identified patent and that said Letters Patent is hereby corrected as shown below:

<u>Drawings,</u>
Sheet 13, figure 15, "ACCORDING" should read -- ACCORDANCE --.
Sheet 17. figure 19, "AND CORRECTED" should read -- CORRECTED --.

<u>Column 1,</u>
Line 56, "back it" should read -- it back --.

<u>Column 4,</u>
Line 44, "image" should read -- images --.

<u>Column 7,</u>
Line 25, "display" should read -- displayed --.

<u>Column 8,</u>
Line 7, "ever" should read -- even --.
Line 31, "device" should read -- devices --.

<u>Column 11,</u>
Line 10, "system" should read -- systems --.

<u>Column 12,</u>
Line 45, "trouble" should read -- problem --.

<u>Column 13,</u>
Line 57, "trouble" should read -- problem --.

<u>Column 16,</u>
Line 66, "arrange" should read -- arranged --.

UNITED STATES PATENT AND TRADEMARK OFFICE
CERTIFICATE OF CORRECTION

PATENT NO. : 6,704,042 B2
DATED : March 9, 2004
INVENTOR(S) : Taichi Matsui et al.

It is certified that error appears in the above-identified patent and that said Letters Patent is hereby corrected as shown below:

Column 17,
Line 31, "arrange" should read -- arranged --.

Column 18,
Line 17, "arrange" should read -- arranged --.
Line 35, "fight-eye" should read -- right-eye --.

Signed and Sealed this

Tenth Day of August, 2004

JON W. DUDAS
*Acting Director of the United States Patent and Trademark Office*